(12) United States Patent
Asahi et al.

(10) Patent No.: US 11,062,851 B2
(45) Date of Patent: Jul. 13, 2021

(54) THIN FILM CAPACITOR EMBEDDED SUBSTRATE AND ITS MANUFACTURING METHOD

(71) Applicant: TDK Corporation, Tokyo (JP)

(72) Inventors: Toshio Asahi, Tokyo (JP); Hitoshi Saita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/790,347

(22) Filed: Feb. 13, 2020

(65) Prior Publication Data

US 2020/0266003 A1    Aug. 20, 2020

(30) Foreign Application Priority Data

Feb. 20, 2019    (JP) .............................. JP2019-028677

(51) Int. Cl.

| H01G 2/06 | (2006.01) |
|---|---|
| H01G 4/008 | (2006.01) |
| H01G 4/33 | (2006.01) |
| H01L 23/12 | (2006.01) |
| H01G 4/30 | (2006.01) |
| H05K 1/16 | (2006.01) |
| H05K 3/46 | (2006.01) |

(52) U.S. Cl.
CPC ............... *H01G 4/33* (2013.01); *H01G 2/065* (2013.01); *H01G 4/008* (2013.01)

(58) Field of Classification Search
CPC .......... H01G 2/065; H01G 2/06; H01G 4/008; H01G 4/232; H01G 4/33; H01G 4/385; H01G 4/30; H01L 23/12; H05K 1/16; H05K 3/46
USPC .......................... 361/311; 174/255, 259, 262
See application file for complete search history.

(56) References Cited

U.S. PATENT DOCUMENTS

| 2006/0137905 | A1 | 6/2006 | Kariya et al. | |
| 2009/0140400 | A1* | 6/2009 | Amey, Jr. et al. | H05K 1/162 257/664 |
| 2009/0148962 | A1* | 6/2009 | Lu | H01L 23/50 438/3 |
| 2020/0135406 | A1* | 4/2020 | Aburakawa | H01G 4/008 |

FOREIGN PATENT DOCUMENTS

JP    2005-191559 A    7/2005

* cited by examiner

*Primary Examiner* — Timothy J Thompson
*Assistant Examiner* — Guillermo J Egoavil
(74) *Attorney, Agent, or Firm* — McDermott Will & Emery LLP

(57) ABSTRACT

Disclosed herein is a thin film capacitor embedded substrate that includes a substrate and a plurality of thin film capacitors including at least first and second thin film capacitors embedded in the substrate. The first and second thin film capacitors are connected in parallel and have mutually different self-resonant frequencies.

4 Claims, 28 Drawing Sheets

THIN FILM CAPACITOR EMBEDDED SUBSTRATE AND ITS MANUFACTURING METHOD

BACKGROUND OF THE INVENTION

Field of the Invention

The present invention relates to a thin film capacitor embedded substrate and its manufacturing method and, more particularly, to a thin film capacitor embedded substrate capable of mounting thereon a plurality of semiconductor chips having different operating frequencies and its manufacturing method.

Description of Related Art

A circuit substrate mounted with an IC is generally mounted with a decoupling capacitor so as to stabilize the potential of a power supply to be supplied to the IC. As the decoupling capacitor, a multilayer ceramic chip capacitor is commonly used, and a required decoupling capacitance is ensured by mounting a large number of multilayer ceramic chip capacitors on the circuit substrate.

However, in recent years, a space on the circuit substrate for mounting a large number of multilayer ceramic chip capacitors may sometimes be insufficient. Therefore, in place of the multilayer ceramic chip capacitor, a thin film capacitor that can be embedded in the circuit substrate is sometimes used (see JP 2005-191559A).

However, in the thin film capacitor embedded substrate described in JP 2005-191559A, a frequency band achieving a decoupling effect is narrow, so that when, for example, a plurality of semiconductor chips having different operating frequencies are mounted, it is difficult to sufficiently absorb power supply noise resulting from the operations of the semiconductor chips.

SUMMARY

It is therefore an object of the present invention to expand a frequency band achieving a decoupling effect in a thin film capacitor embedded substrate. Another object of the present invention is to provide a manufacturing method for such a thin film capacitor embedded substrate.

A thin film capacitor embedded substrate according to the present invention is a thin film capacitor embedded substrate in which at least first and second thin film capacitors connected in parallel are embedded, and the first and second thin film capacitors have mutually different self-resonant frequencies.

According to the present invention, a plurality of thin film capacitors having mutually different self-resonant frequencies are embedded, a frequency band with low impedance is expanded. This can expand a frequency band achieving a decoupling effect.

In the present invention, the first thin film capacitor may have a self-resonant frequency higher than that of the second thin film capacitor and may be disposed closer to a component mounting surface side than the second thin film capacitor is. With this configuration, it is possible to reduce impedance which, if the second thin film capacitor alone is used, may increase at frequencies higher than the self-resonant frequency of the second thin film capacitor.

The thin film capacitor embedded substrate according to the present invention may further have a plurality of semiconductor chips mounted on the component mounting surface, and the plurality of semiconductor chips may have mutually the same operating frequency or at least some of the plurality of semiconductor chips may have mutually different operating frequencies from one another. When some of the semiconductor chips have different operating frequencies from one another, power supply noise resulting from the operation of one semiconductor chip and power supply noise resulting from the operation of another semiconductor chip have mutually different frequency bands; however, in the thin film capacitor embedded substrate according to the present invention, a frequency band achieving a high decoupling effect is wide, so that power supply noise generated from both the semiconductor chips can be absorbed. Further, even when the plurality of semiconductor chips have the same operating frequency, it is possible to obtain a high decoupling effect in a wide frequency band.

In the present invention, the first and second thin film capacitors may each have a lower electrode layer made of a first conductive material and an upper electrode layer made of a second conductive material different from the first conductive material, and the lower electrode layers or upper electrode layers of the respective first and second thin film capacitors may be disposed so as to face each other. With this configuration, warpage of the thin film capacitor embedded substrate due to difference in material can be reduced.

The thin film capacitor embedded substrate according to the present invention may further include a third thin film capacitor embedded therein so as to be connected in parallel to the first and second thin film capacitors, and the first to third thin film capacitors may have mutually different self-resonant frequencies. With this configuration, it is possible to further expand a frequency band achieving a decoupling effect. In this case, a thin film capacitor having a higher self-resonant frequency may be disposed closer to the component mounting surface.

A manufacturing method for a thin film capacitor embedded substrate according to the present invention may include a step of laminating, on a substrate, at least first and second thin film capacitors each having an upper electrode layer and a lower electrode layer that have previously been patterned therein and having mutually different self-resonant frequencies and a step of connecting in parallel the first and second thin film capacitors by forming a via conductor penetrating the first and second thin film capacitors. Alternatively, the manufacturing method may include a step of laminating, on a substrate, at least first and second thin film capacitors having mutually different self-resonant frequencies and then patterning an upper electrode layer and a lower electrode layer of each of the first and second thin film capacitors and a step of connecting in parallel the first and second thin film capacitors by forming a via conductor penetrating the first and second thin film capacitors. By either method, the above-described thin film capacitor embedded substrate according to the present invention can be manufactured.

Thus, according to the present invention, there can be provided a thin film capacitor embedded substrate achieving a decoupling effect over a wide frequency band.

BRIEF DESCRIPTION OF THE DRAWINGS

The above features and advantages of the present invention will be more apparent from, the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

First Embodiment

Figure 1:
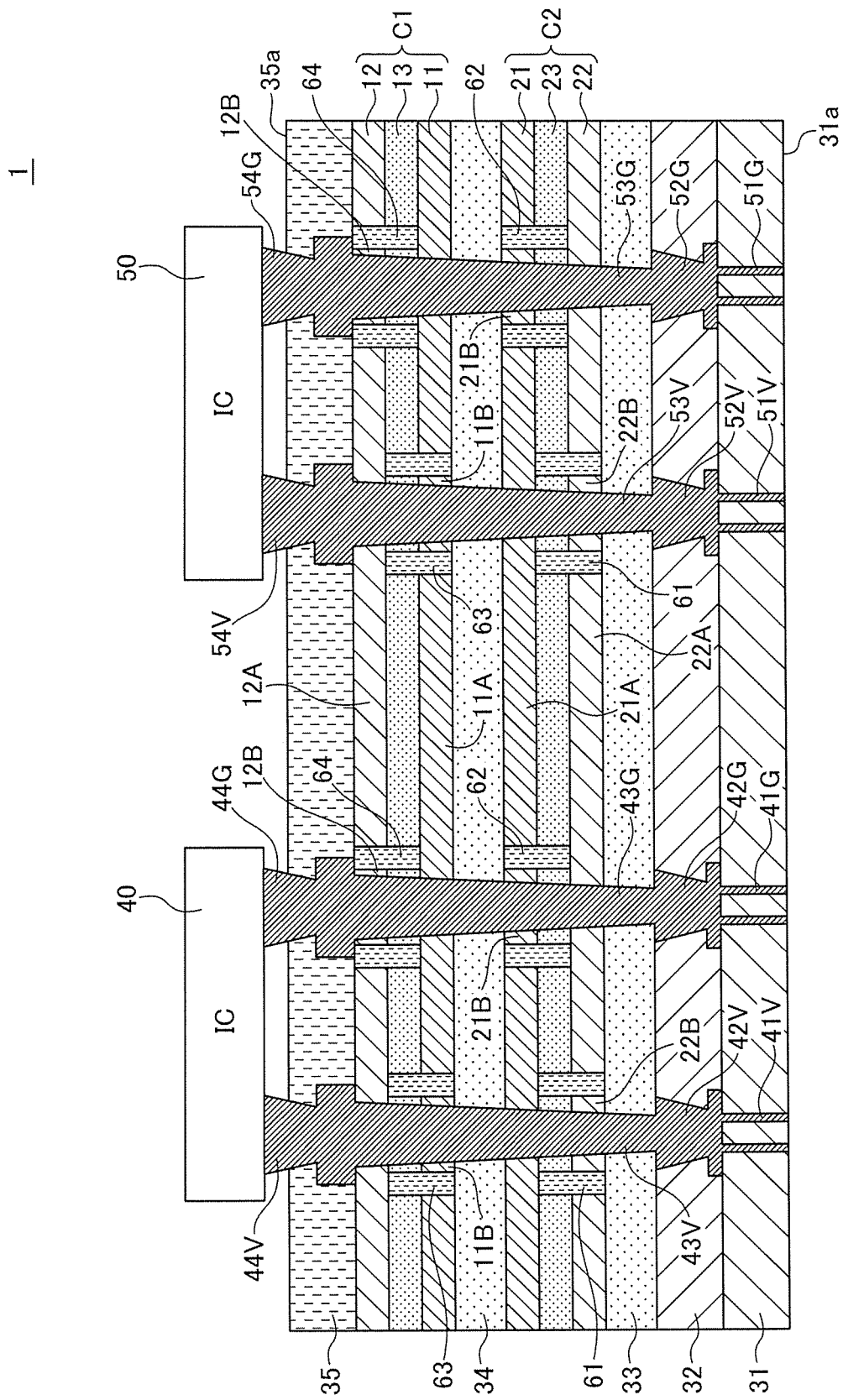
FIG. 1 is a schematic cross-sectional view for explaining the structure of a thin film capacitor embedded substrate according to a first embodiment of the present invention.

FIG. 1 is a schematic cross-sectional view for explaining the structure of a thin film capacitor embedded substrate 1 according to the first embodiment of the present invention.

As illustrated in FIG. 1, the thin film capacitor embedded substrate 1 according to the first embodiment has a multi-layer wiring structure including insulating layers 31 to 35, a first thin film capacitor C1 embedded between the insulating layers 34 and 35, a second thin film capacitor C2 embedded between the insulating layers 33 and 34, and first and second semiconductor chips 40 and 50 mounted on a component mounting surface 35a. The semiconductor chips 40 and 50 have mutually different operating frequencies. For example, the semiconductor chips 40 and 50 may be a logic chip such as a CPU and a memory chip such as a DRAM, respectively. In FIG. 1, only a power supply pattern connected to each of the semiconductor chips 40 and 50 is illustrated; however, it goes without saying that a large number of signal wiring patterns are actually provided.

The first thin film capacitor C1 includes a lower electrode layer 11, an upper electrode layer 12, and a dielectric layer 13 positioned between the lower and upper electrode layers 11 and 12. Similarly, the second thin film capacitor C2 includes a lower electrode layer 21, an upper electrode layer 22 and a dielectric layer 23 positioned between the lower and upper electrode layers 21 and 22. As illustrated in FIG. 1, in the present embodiment, the lower electrode layer 11 of the first thin film capacitor C1 and the lower electrode layer 21 of the second thin film capacitor C2 are embedded so as to face each other through the insulating layer 34. Alternatively, conversely, the upper electrode layer 12 of the first thin film capacitor C1 and the upper electrode layer 22 of the second thin film capacitor C2 may be embedded so as to face each other through the insulating layer 34.

The lower electrode layers 11 and 21 serve as bases of the thin film capacitors C1 and C2, respectively, and are each made of nickel (Ni). That is, the "lower electrode layer" refers to an electrode layer positioned on the lower side at the time of manufacture and does not indicate the vertical positional relationship among the layers in a state where they are embedded in the thin film capacitor embedded substrate 1. The upper electrode layers 12 and 22 are each made of a laminated film of, e.g., nickel (Ni) and copper (Cu). The "upper electrode layer" refers to an electrode layer positioned on the upper side at the time of manufacture and does not indicate the vertical positional relationship among the layers in a state where they are embedded in the thin film capacitor embedded substrate 1. The dielectric layers 13 and 23 are each made of a ceramic material, such as barium titanate, having a perovskite structure.

The first and second thin film capacitors C1 and C2 have mutually different self-resonant frequencies. Specifically, the first thin film capacitor C1 is higher in self-resonant frequency than the second thin film capacitor C2. Examples of a method of making the self-resonant frequency different between the first and second thin film capacitors C1 and C2 include one that makes the planar size different therebetween and one that makes thickness or material of the dielectric layer different therebetween.

The upper electrode layer 22 of the second thin film capacitor C2 is divided into a capacitor region 22A and a non-capacitor region 22B by a ring-shaped insulator 61 made of resin or the like. Similarly, the lower electrode layer 21 of the second thin film capacitor C2 is divided into a capacitor region 21A and a non-capacitor region 21B by a ring-shaped insulator 62 made of resin or the like. The lower electrode layer 11 of the first thin film capacitor C1 is divided into a capacitor region 11A and a non-capacitor region 11B by a ring-shaped insulator 63 made of resin or the like. The upper electrode layer 12 of the first thin film capacitor C1 is divided into a capacitor region 12A and a non-capacitor region 12B by a ring-shaped insulator 64 made of resin or the like.

Power supply patterns 44V and 44G connected respectively to a power supply terminal and a ground terminal of the semiconductor chip 40 are connected respectively to power supply patterns 42V and 42G through respective via conductors 43V and 43G penetrating the thin film capacitors C1 and C2. The power supply patterns 42V and 42G are connected respectively to power supply patterns 41V and 41G exposed to a mounting surface 31a positioned on the side opposite to the component mounting surface 35a. Similarly, power supply patterns 54V and 54G connected respectively to a power supply terminal and a ground terminal of the semiconductor chip 50 are connected respectively to power supply patterns 52V and 52G through respective via conductors 53V and 53G penetrating the thin film capacitors C1 and C2. The power supply patterns 52V and 52G are connected respectively to power supply patterns 51V and 51G exposed to the mounting surface 31a.

Figure 2A:
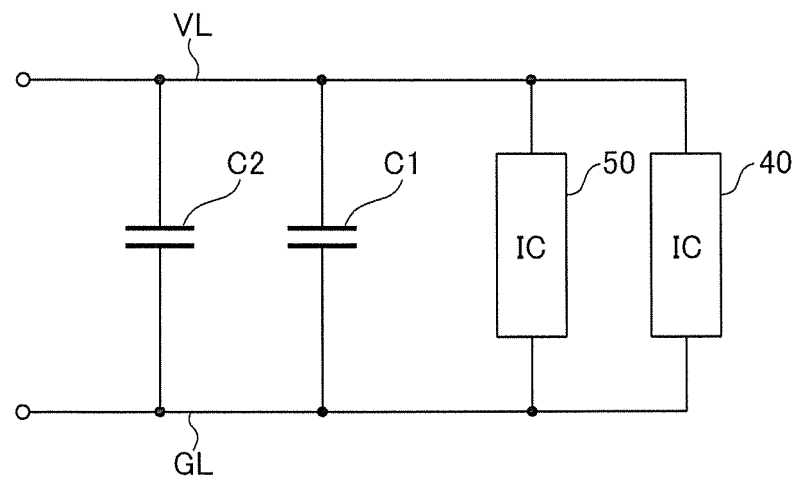
FIG. 2A is an equivalent circuit diagram of the power supply pattern provided in the thin film capacitor embedded substrate.
Figure 2B:
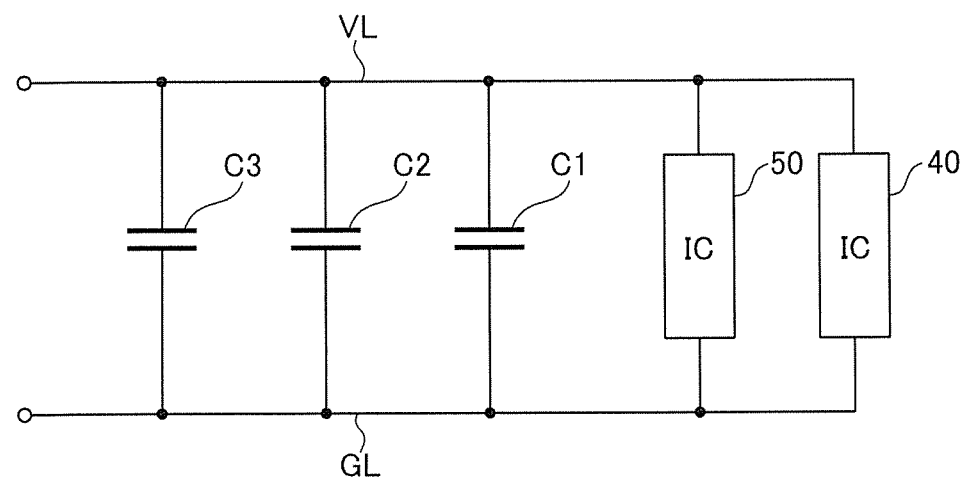
FIG. 2B is an equivalent circuit diagram of the power supply pattern according to a modification.

As illustrated in FIG. 1, the via conductors 43V and 53V are each connected to the capacitor region 12A and non-capacitor region 11B of the first thin film capacitor C1 and the capacitor region 21A and non-capacitor region 22B of the second thin film capacitor C2. On the other hand, the via conductors 43G and 53G are each connected to the non-capacitor region 12B and capacitor region 11A of the first thin film capacitor C1 and the non-capacitor region 21B and capacitor region 22A of the second thin film capacitor C2. Thus, as illustrated in FIG. 2A which is an equivalent circuit diagram, the thin film capacitors C1 and C2 are connected in parallel between a power supply line VL and a ground line GL assigned in common to the semiconductor chips 40 and 50. As shown in FIG. 2B, another thin film capacitor C3 may be connected in parallel between a power supply line VL and a ground line GL. The thin film capacitors C1, C2, and C3 may have mutually different self-resonant frequencies.

Figure 3:
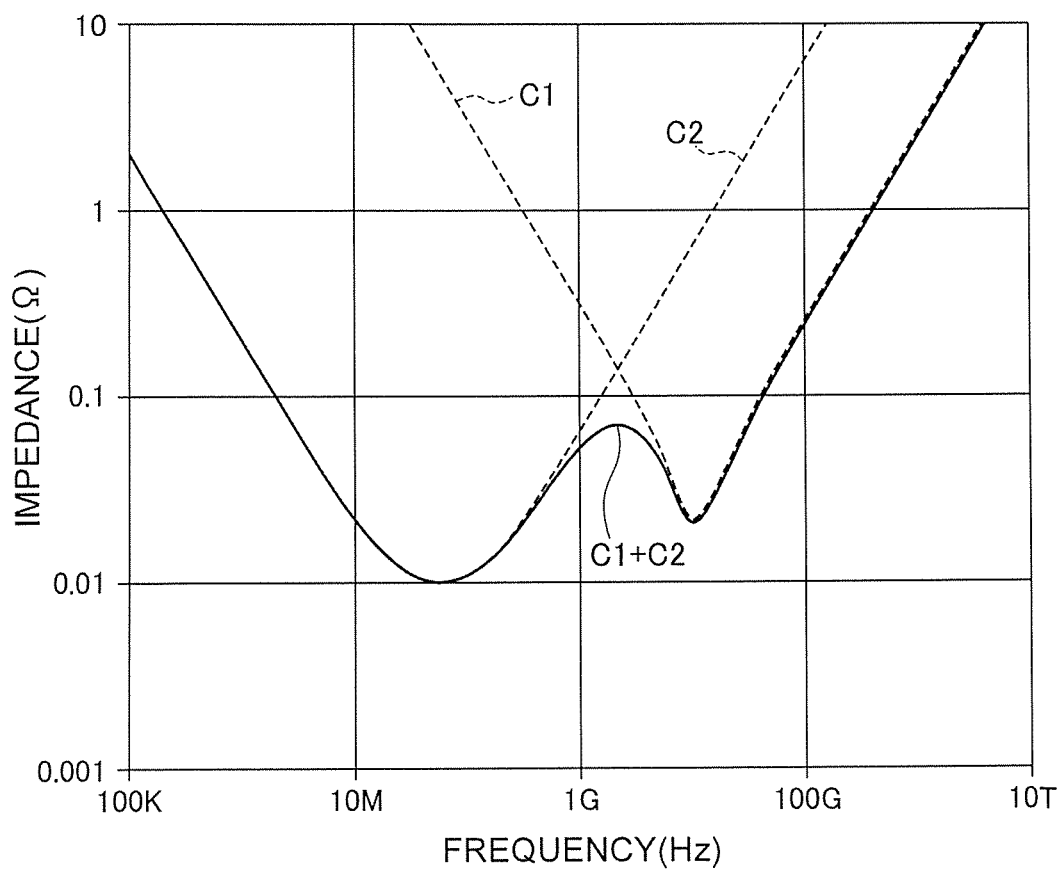
FIG. 3 is a graph for explaining effects of the thin film capacitor embedded substrate according to the first embodiment of the present invention.

FIG. 3 is a graph for explaining effects of the thin film capacitor embedded substrate 1 according to the present embodiment.

In the example of FIG. 3, the self-resonant frequency of the first thin film capacitor C1 is a several GHz band, and that of the second thin film capacitor C2 is a several tens MHz band. In the present embodiment, the two thin film capacitors C1 and C2 are connected in parallel, so that it is possible to obtain sufficiently low combined impedance over a wide frequency band ranging from several tens of MHz to several GHz. As a result, when, for example, the frequency band of power supply noise resulting from the operation of the semiconductor chip 40 is a several GHz band, and the frequency band of power supply noise resulting from the operation of the semiconductor chip 50 is a several tens MHz band, the power supply noise generated from both the semiconductor chips 40 and 50 can be absorbed to make it possible to stabilize power supply voltage. The self-resonant frequency can be measured as follows: the thin film capacitor embedded substrate 1 is polished from the component mounting surface 35a to expose the via conductors 43V, 43G, 53V and 53G, and an impedance analyzer probe is connected on the exposed via conductors 43V, 43G, 53V and 53G. As a result, a frequency at which the impedance becomes lowest is the self-resonant frequency.

In addition, in the thin film capacitor embedded substrate 1 according to the present embodiment, the first thin film capacitor C1 higher in self-resonant frequency than the second thin film capacitor C2 is disposed on the component mounting surface 35a side, so that a parasitic inductance component between the first thin film capacitor C1 and the semiconductor chips 40, 50 becomes small. This make it possible to further reduce the impedance of the first thin film capacitor C1 having a high self-resonant frequency.

Further, in the thin film capacitor embedded substrate 1 according to the present embodiment, the lower electrode layer 11 of the first thin film capacitor C1 and the lower electrode layer 21 of the second thin film capacitor C2 face each other. That is, the first and second thin film capacitors C1 and C2 are embedded in mutually vertically opposite directions. Thus, warpage of the thin film capacitor embedded substrate 1 due to lamination of different materials is reduced.

The following describes a manufacturing method for the thin film capacitor embedded substrate 1 according to the present embodiment.

FIGS. 4 to 12 are process views for explaining the manufacturing method for the thin film capacitor embedded substrate 1 according to the present embodiment.

Figure 4:
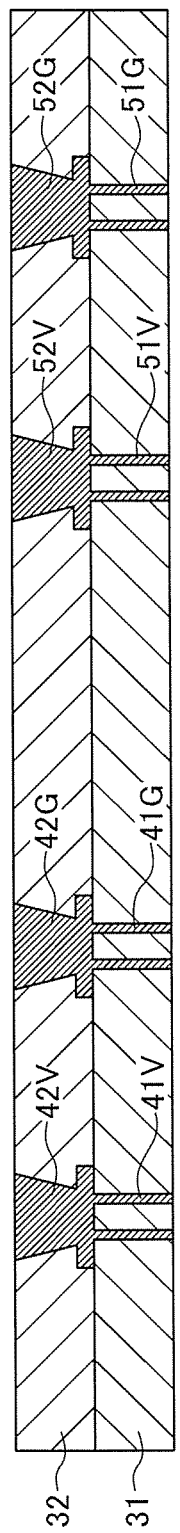
FIGS. 4 to 12 are process views for explaining the manufacturing method for the thin film capacitor embedded substrate according to the first embodiment of the present invention.

As illustrated in FIG. 4, a laminated body of the insulating layer 31 having the power supply patterns 41V, 41G, 51V and 51G and the insulating layer 32 having the power supply patterns 42V, 42G, 52V, and 52G is prepared. For example, the insulating layer 31 is a core substrate obtained by impregnating a core material such as glass cloth with resin, and the insulating layer 32 is a buildup layer formed on the surface of the core substrate.

Figure 5:
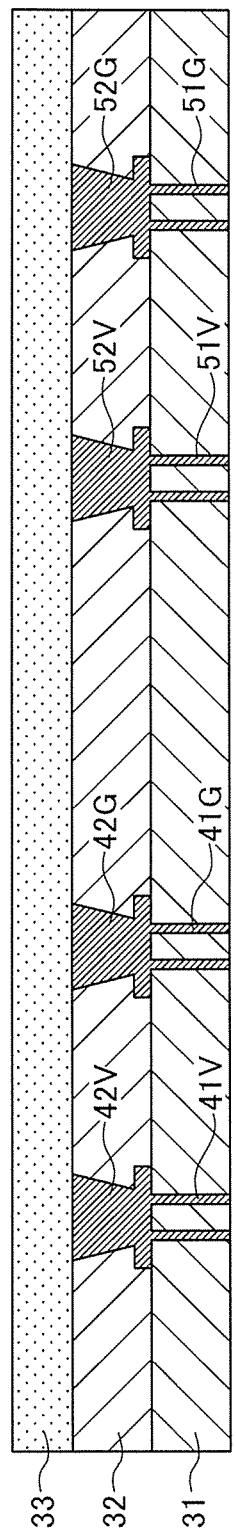
Figure 6:
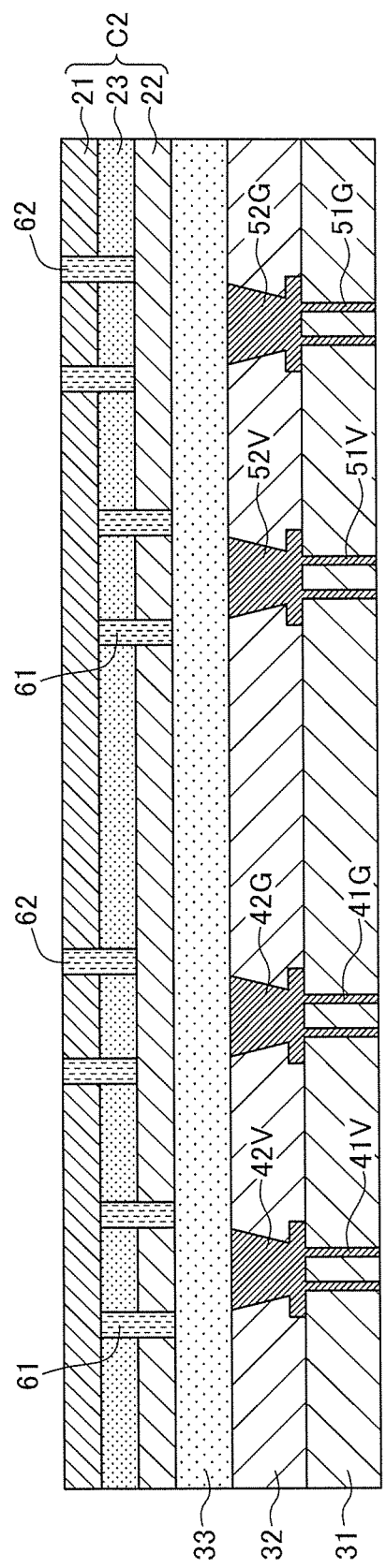
Figure 7:
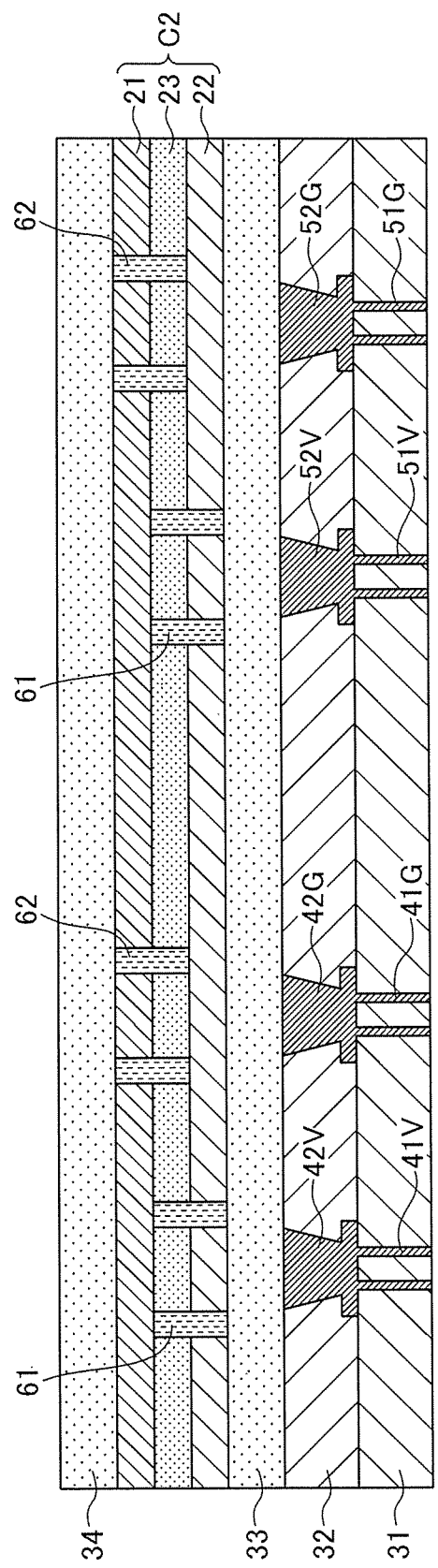
Figure 8:
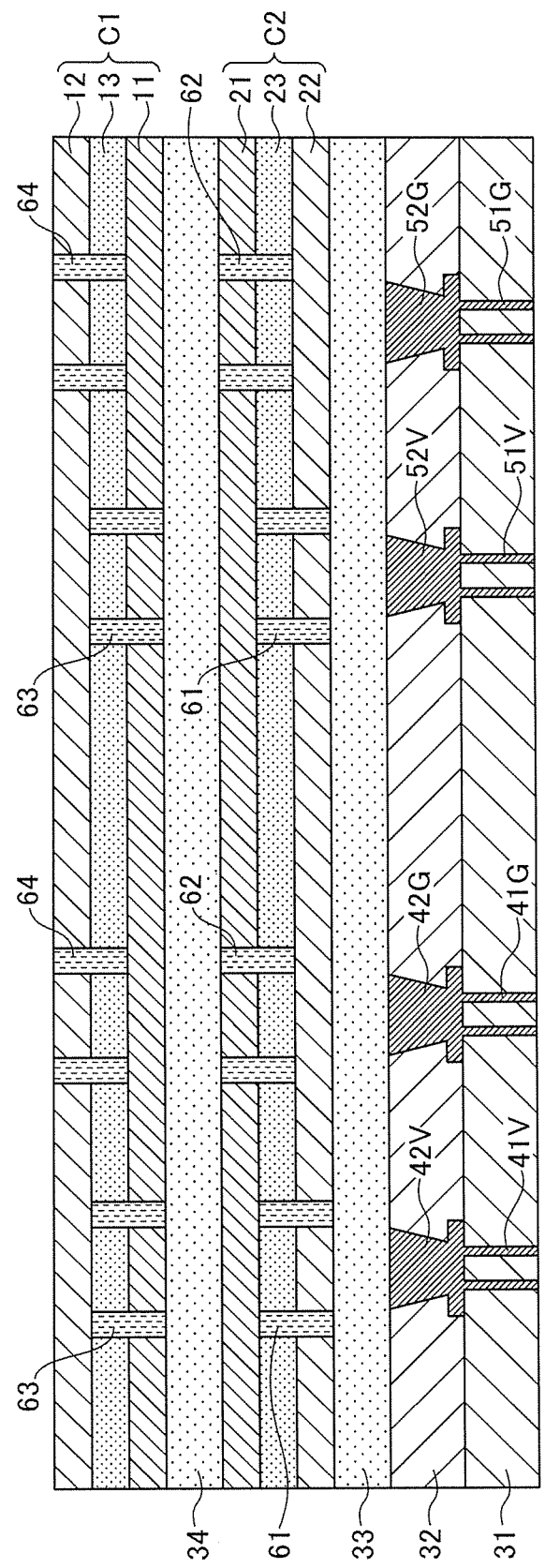

Then, as illustrated in FIG. 5, the insulating layer 33 is laminated on the surface of the insulating layer 32, and then the second thin film capacitor C2 is laminated on the surface of the insulating layer 33 as illustrated in FIG. 6. As described above, the second thin film capacitor C2 is laminated in a vertically inverted manner such that the lower electrode layer 21 faces upward. In the present embodiment, the second thin film capacitor C2 is laminated in a state where the lower electrode layer 21 and upper electrode layer 22 have already been patterned therein. Subsequently, as illustrated in FIG. 7, the insulating layer 34 is laminated on the surface of the second thin film capacitor C2 and, as illustrated in FIG. 8, the first thin film capacitor C1 is laminated on the surface of the insulating layer 34. As described above, the first thin film capacitor C1 is laminated such that the lower electrode layer 21 faces downward. In the present embodiment, the first thin film capacitor C1 is laminated in a state where the lower electrode layer 11 and upper electrode layer 12 have already been patterned therein.

Figure 9:
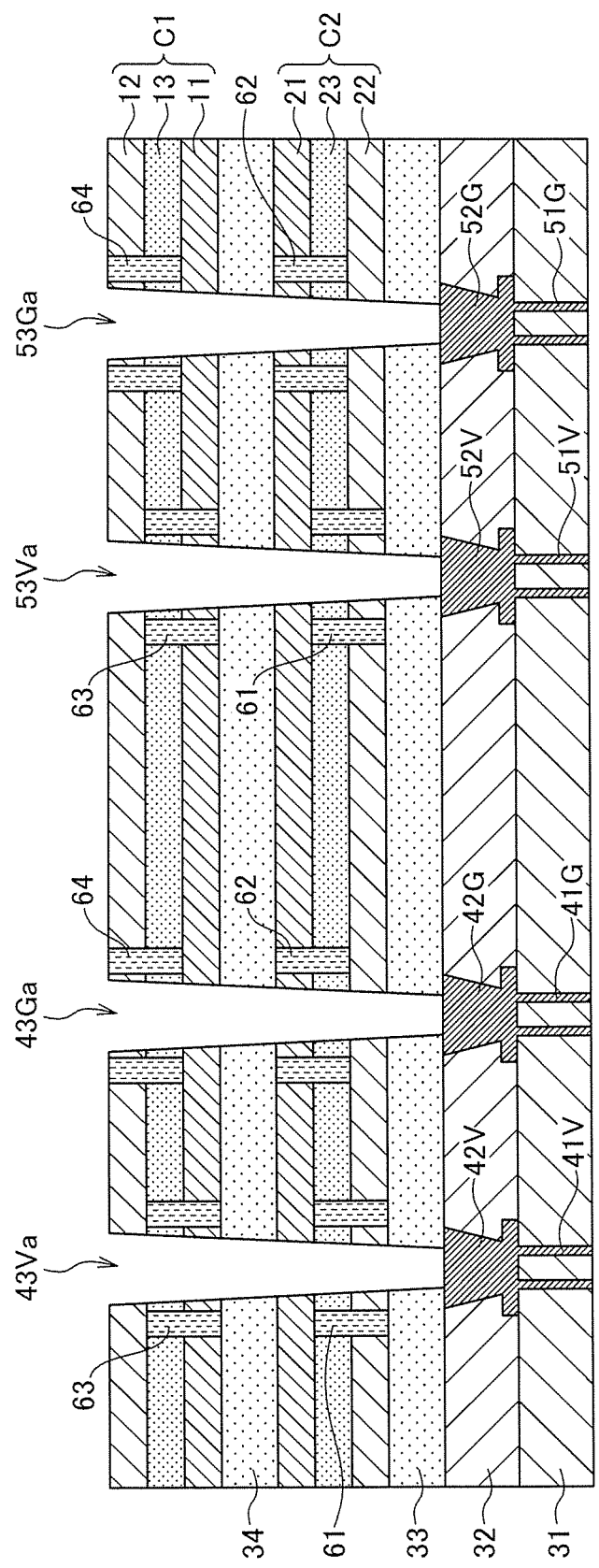
Figure 10:
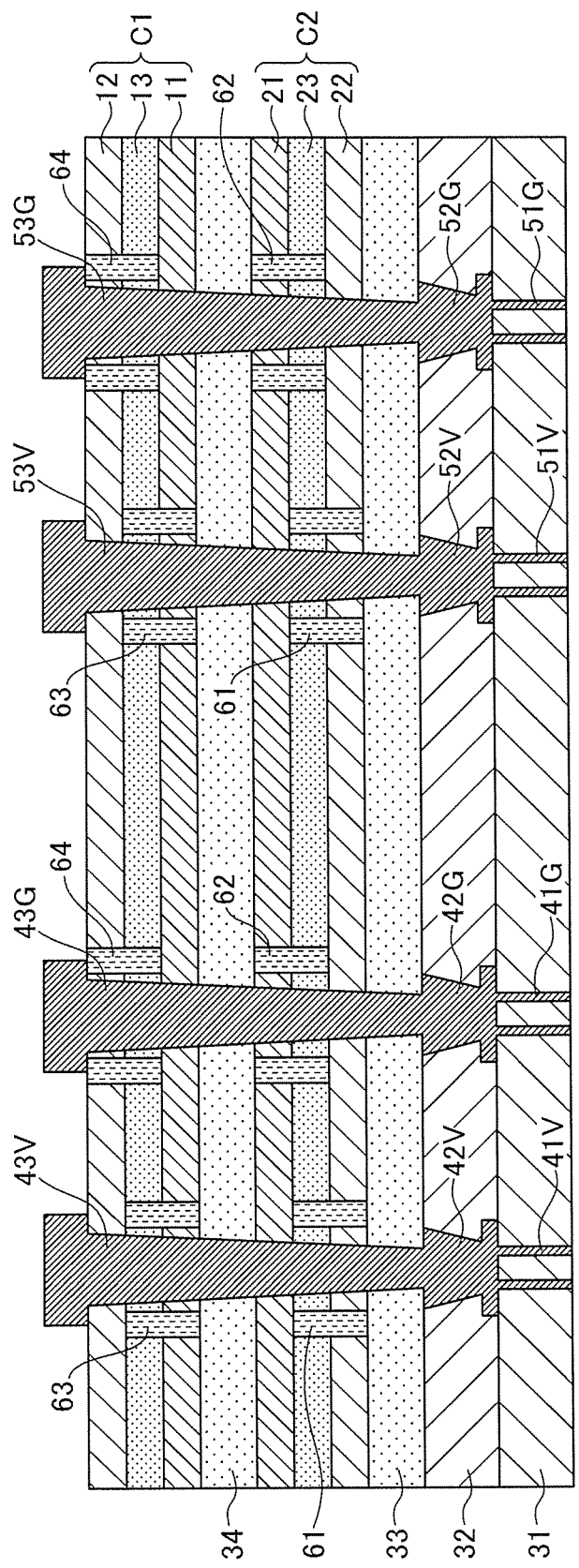

Then, as illustrated in FIG. 9, there are formed through holes 43Va, 43Ga, 53Va and 53Ga penetrating the first thin film capacitor C1, insulating layer 34, second thin film capacitor C2 and insulating layer 33 and reaching the power supply patterns 42V, 42G, 52V and 52G, respectively. The through holes 43Va and 53Va are each formed at a location that passes through the inner diameter portions of the respective ring-shaped insulators 61 and 63, and the through holes 43Ga and 53Ga are each formed at a location that passes through the inner diameter portions of the respective ring-shaped insulators 62 and 64. The through holes 43Va, 43Ga, 53Va and 53Ga can be formed by laser processing or blasting. Subsequently, as illustrated in FIG. 10, the via conductors 43V, 43G, 53V and 53G are formed inside the through holes 43Va, 43Ga, 53Va and 53Ga. The via conductors 43V, 43G, 53V and 53G can be formed as follows: a thin seed layer is formed on the inner surface of each of the through holes 43Va, 43Ga, 53Va and 53Ga by electroless plating or sputtering, and then a conductive material such as copper is grown by electrolytic plating.

Figure 11:
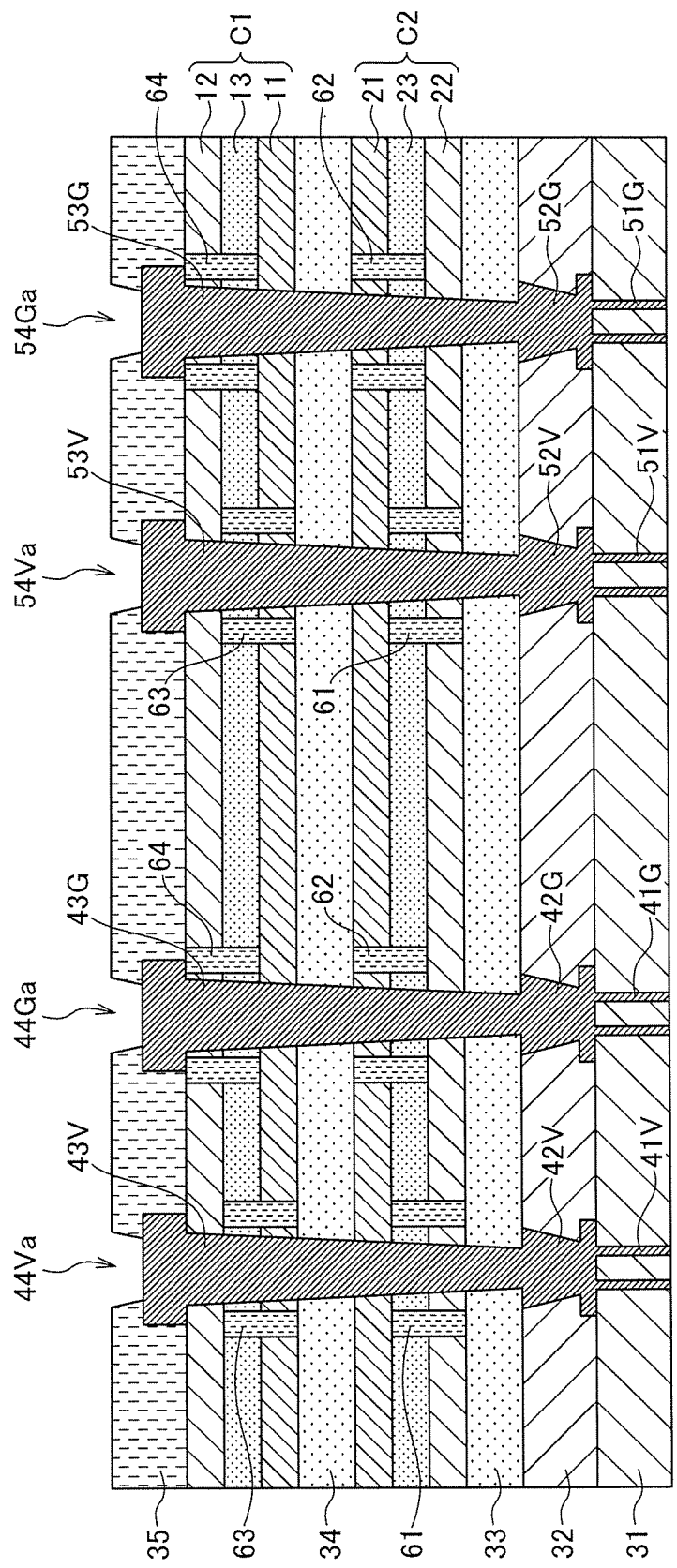
Figure 12:
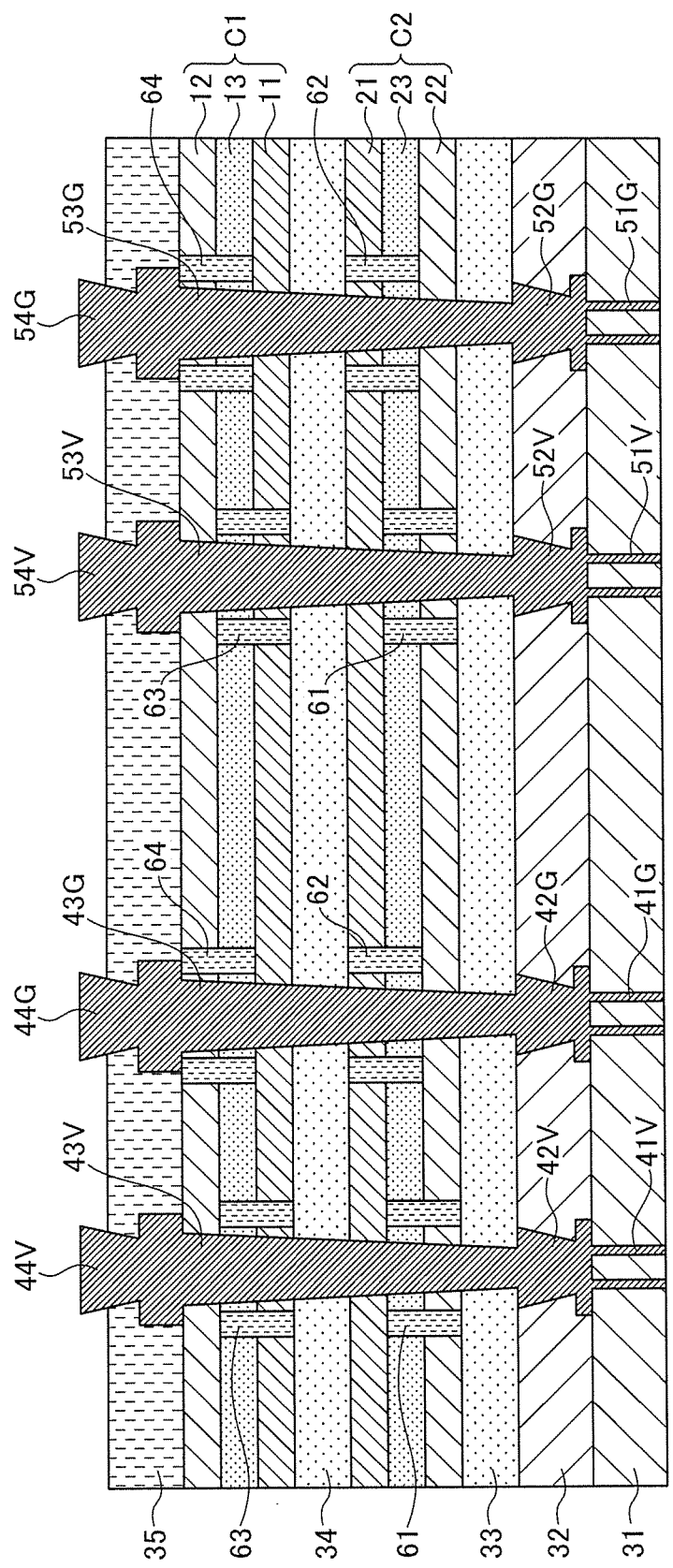

Subsequently, as illustrated in FIG. 11, the insulating layer 35 is laminated on the surface of the first thin film capacitor C1. After that, there are formed through holes 44Va, 44Ga, 54Va and 54Ga penetrating the insulating layer 35 and reaching the via conductors 43V, 43G, 53V and 53G, respectively. The through holes 44Va, 44Ga, 54Va and 54Ga can be formed by laser processing or blasting. Subsequently, as illustrated in FIG. 12, the power supply patterns 44V, 44G, 54V and 54G are formed inside the through holes 44Va, 44Ga, 54Va and 54Ga, respectively. The power supply patterns 44V, 44G, 54V and 54G can be formed as follows: a thin seed layer is formed on the inner surface of each of the through holes 44Va, 44Ga, 54Va and 54Ga by electroless plating or sputtering, and then a conductive material such as copper is grown by electrolytic plating.

Finally, the semiconductor chip 40 is mounted on the component mounting surface 35a so as to be connected to the power supply patterns 44V and 44G, and the semiconductor chip 50 is mounted on the component mounting surface 35a so as to be connected to the power supply patterns 54V and 54G, whereby the thin film capacitor embedded substrate 1 of FIG. 1 according to the first embodiment is completed.

As described above, the thin film capacitor embedded substrate 1 according to the present embodiment has a configuration in which the thin film capacitors C1 and C2 in each of which the upper and lower electrode layers have been patterned are laminated on the substrate and can thus be easily manufactured through a comparatively simple process.

Figure 13:
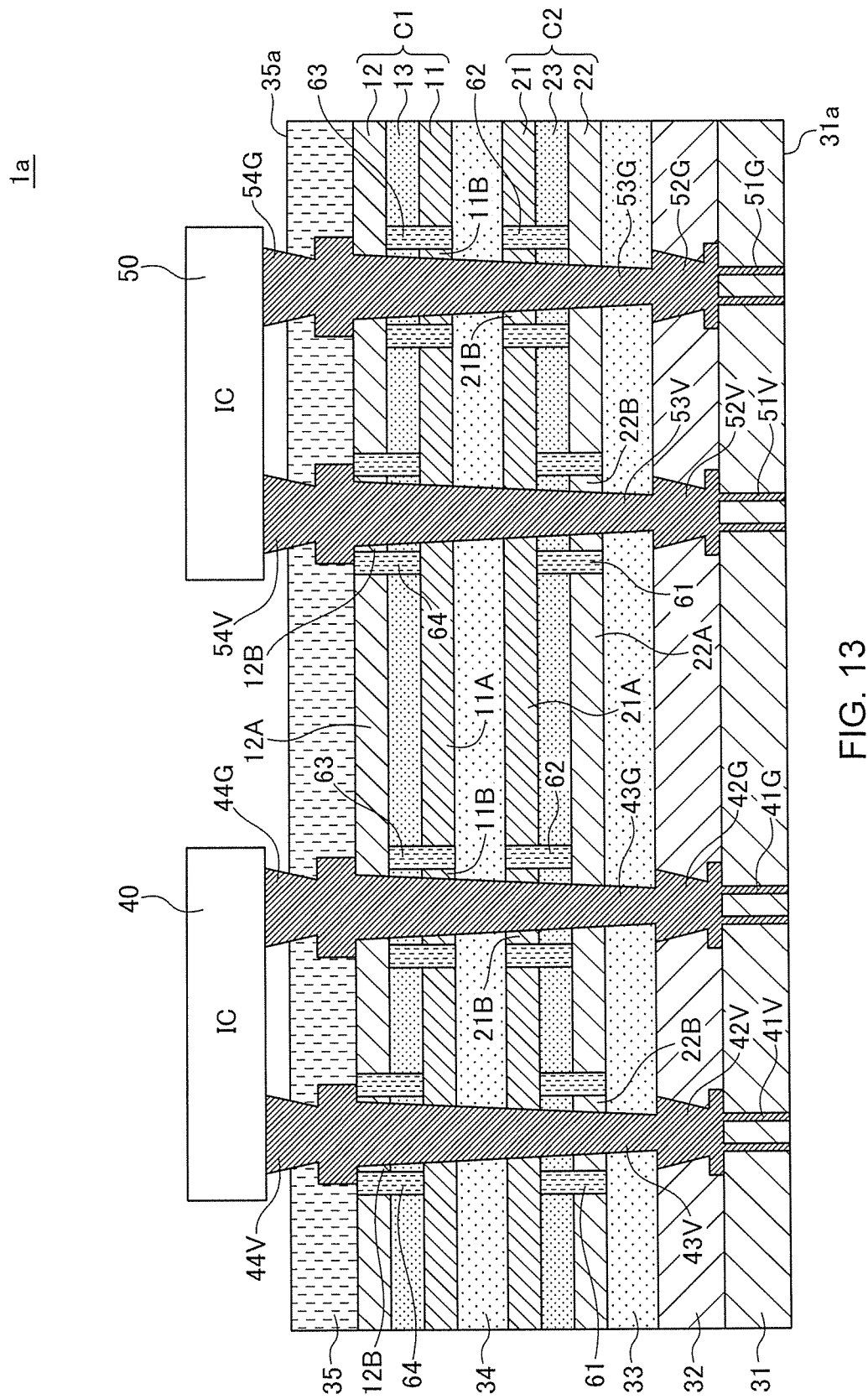
FIG. 13 is a schematic cross-sectional view for explaining the structure of a thin film capacitor embedded substrate according to a modification of the first embodiment of the present invention.

FIG. 13 is a schematic cross-sectional view for explaining the structure of a thin film capacitor embedded substrate 1a according to a modification of the first embodiment.

As illustrated in FIG. 13, the thin film capacitor embedded substrate 1a according to the modification differs from the thin film capacitor embedded substrate 1 illustrated in FIG. 1 in that the capacitor region 11A of the first thin film capacitor C1 and the capacitor region 21A of the second thin film capacitor C2 are short-circuited by the via conductors 43V and 53V and that the capacitor region 12A of the first thin film capacitor C1 and the capacitor region 22A of the second thin film capacitor C2 are short-circuited by the via conductors 43G and 53G. Other basic configurations are the same as those of the thin film capacitor embedded substrate 1 illustrated in FIG. 1, so the same reference numerals are given to the same elements, and overlapping description will be omitted.

As described above, in the thin film capacitor embedded substrate 1a according to the modification, the capacitor regions 11A and 21A made of the same conductive material (e.g., nickel) are short-circuited, and the capacitor regions 12A and 22A made of the same conductive material (e.g., copper) are short-circuited. This allows the same potential to be applied to the same conductive material.

Second Embodiment

Figure 14:
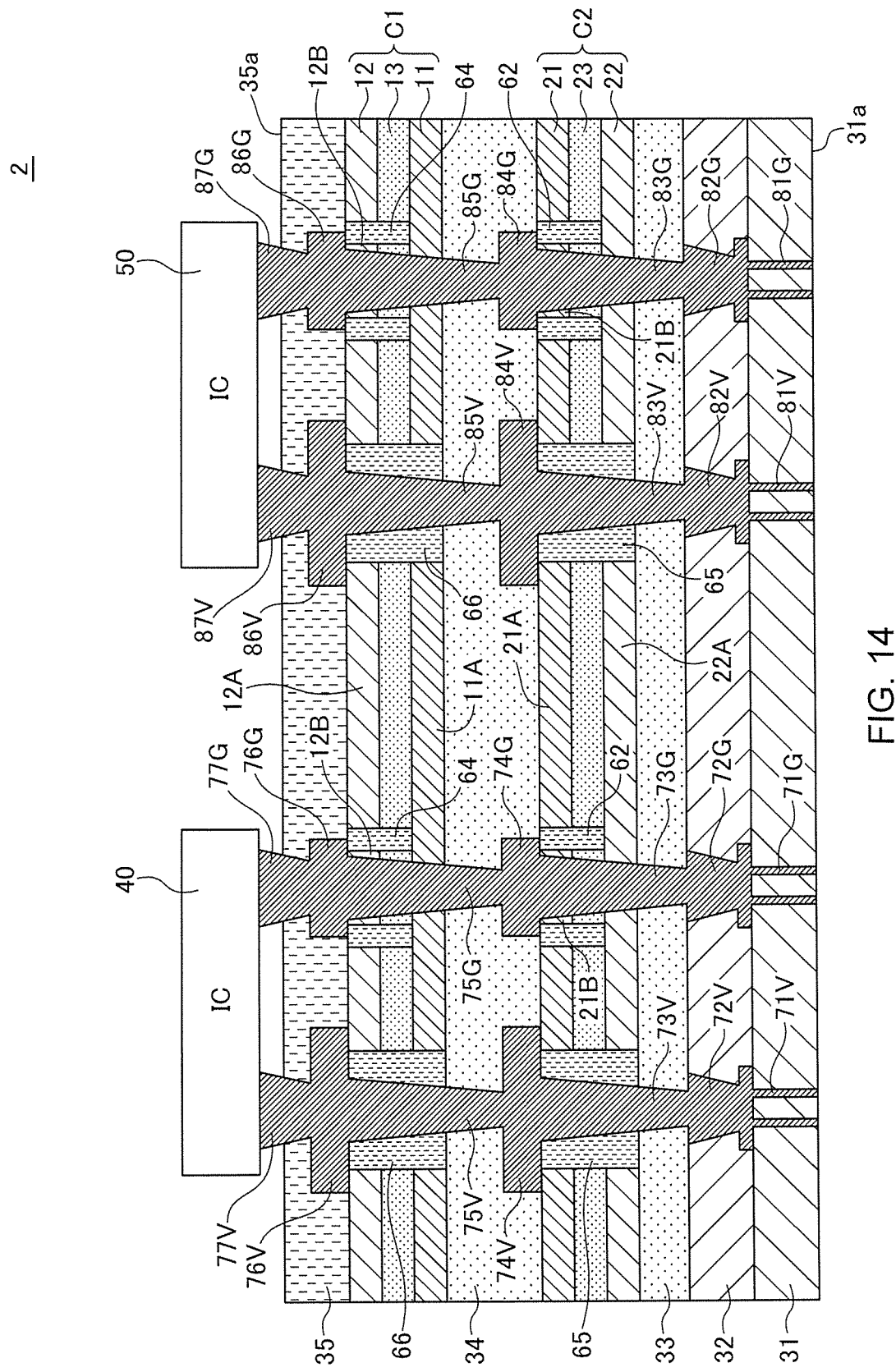
FIG. 14 is a schematic cross-sectional view for explaining the structure of a thin film capacitor embedded substrate according to a second embodiment of the present invention.

FIG. 14 is a schematic cross-sectional view for explaining the structure of a thin film capacitor embedded substrate 2 according to the second embodiment of the present invention.

As illustrated in FIG. 14, the thin film capacitor embedded substrate 2 according to the second embodiment differs from the thin film capacitor embedded substrate 1 illustrated in FIG. 1 in the shapes of the power supply pattern and via conductor and that insulators 65 and 66 are provided in place of the ring-shaped insulators 61 and 63. The insulators 65 and 66 are formed so as to penetrate the second thin film capacitor C2 and first thin film capacitor C1, respectively. Other basic configurations are the same as those of the thin film capacitor embedded substrate 1 illustrated in FIG. 1, so the same reference numerals are given to the same elements, and overlapping description will be omitted.

The thin film capacitor embedded substrate 2 according to the second embodiment has power supply patterns 71V, 71G, 81V and 81G each penetrating the insulating layer 31, power supply patterns 72V, 72G, 82V and 82G each penetrating the insulating layer 32, via conductors 73V, 73G, 83V and 83G each penetrating the second thin film capacitor C2 and insulating layer 33, and power supply patterns 74V, 74G, 84V and 84G each provided on the second thin film capacitor C2. Of the power supply patterns 74V, 74G, 84V and 84G, the power supply patterns 74V and 84V are larger in outer diameter than the insulator 65 and thus contact the capacitor region 21A of the lower electrode layer of the second thin film capacitor C2. On the other hand, the power supply patterns 74G and 84G are smaller in outer diameter than the insulator 62 and thus do not contact the capacitor region 21A.

The thin film capacitor embedded substrate 2 according to the second embodiment further has via conductors 75V, 75G, 85V and 85G each penetrating the first thin film capacitor C1 and insulating layer 34, and power supply patterns 76V, 76G, 86V and 86G each provided on the first thin film capacitor C1, and power supply patterns 77V, 77G, 87V and 87G each penetrating the insulating layer 35. Of the power supply patterns 76V, 76G, 86V and 86G, the power supply patterns 76V and 86V are larger in outer diameter than the insulator 66 and thus contact the capacitor region 12A of the upper electrode layer of the first thin film capacitor C1. On the other hand, the power supply patterns 76G and 86G are smaller in outer diameter than the insulator 64 and thus do not contact the capacitor region 12A.

The power supply patterns 77V and 77G are connected respectively to the power supply terminal and ground terminal of the semiconductor chip 40, and the power supply patterns 87V and 87G are connected respectively to the power supply terminal and ground terminal of the semiconductor chip 50.

In the present embodiment, the insulator 65 penetrates the second thin film capacitor C2, so that the via conductors 73V and 83V themselves do not contact the second thin film capacitor C2; however, the power supply patterns 74V and 84V connected respectively to the via conductors 73V and 83V contact the capacitor region 21A of the lower electrode layer, so that, as in the first embodiment, the via conductors 73V and 83V have the same potential as the capacitor region 21A of the lower electrode layer. Similarly, the insulator 66 penetrates the first thin film capacitor C1, so that the via conductors 75V and 85V themselves do not contact the first thin film capacitor C1; however, the power supply patterns 76V and 86V connected respectively to the via conductors 75V and 85V contact the capacitor region 12A of the upper electrode layer, so that, as in the first embodiment, the via conductors 75V and 85V have the same potential as the capacitor region 12A of the upper electrode layer.

Thus, the thin film capacitor embedded substrate 2 according to the present embodiment has the same connection relationship as the thin film capacitor embedded substrate 1 according to the first embodiment. Therefore, the same effects as in the thin film capacitor embedded substrate 1 according to the first embodiment can be obtained.

The following describes a manufacturing method for the thin film capacitor embedded substrate 2 according to the present embodiment.

FIGS. 15 to 27 are process views for explaining the manufacturing method for the thin film capacitor embedded substrate 2 according to the present embodiment.

Figure 15:
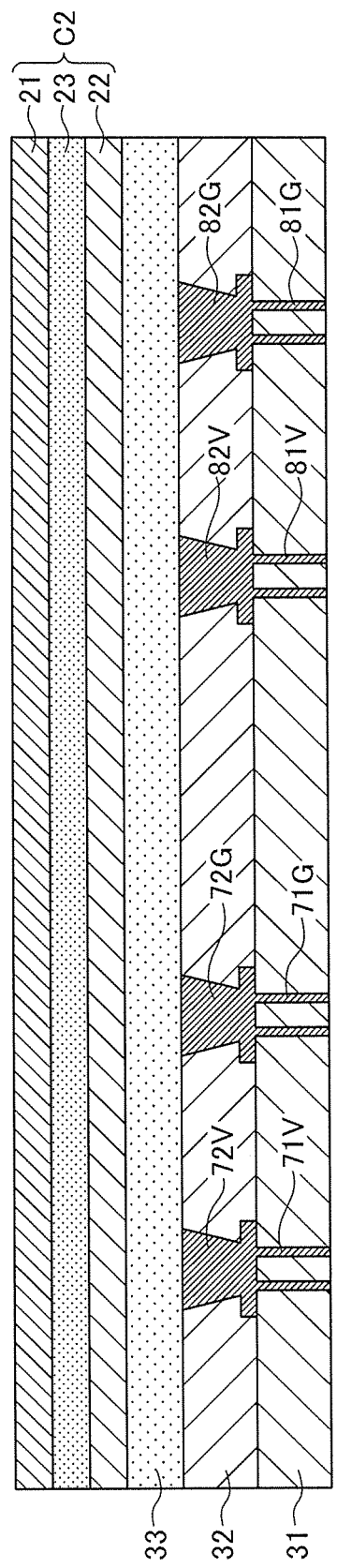
FIGS. 15 to 27 are process views for explaining the manufacturing method for the thin film capacitor embedded substrate according to the second embodiment of the present invention.
Figure 16:
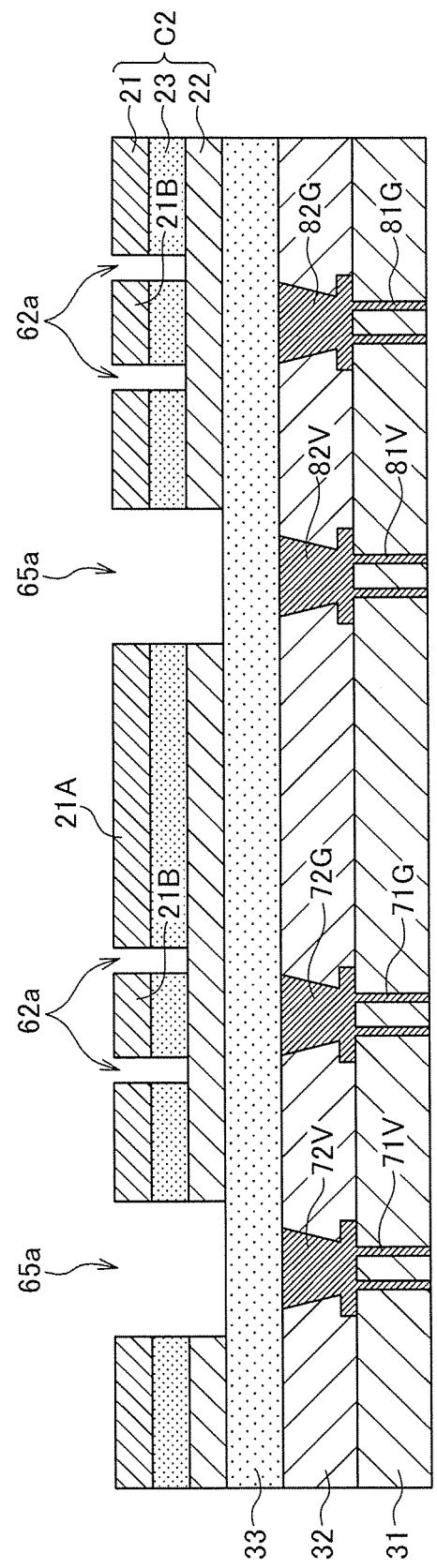

After the processes described using FIGS. 4 and 5, the second thin film capacitor C2 is laminated on the surface of the insulating layer 33 as illustrated in FIG. 15. In the present embodiment, the second thin film capacitor C2 in which the lower electrode layer 21 and upper electrode layer 22 have not been patterned is laminated. Subsequently, as illustrated in FIG. 16, the second thin film capacitor C2 is patterned to form openings 65a at locations overlapping the power supply patterns 72V and 82V, respectively, and ring-shaped openings 62a at locations overlapping the power supply patterns 72G and 82G, respectively. The opening 65a is formed so as to penetrate the second thin film capacitor C2, and the insulating layer 33 is exposed on the bottom portion of the opening 65a. On the other hand, the ring-shaped opening 62a has such a depth as to penetrate the lower electrode layer 21 and not to penetrate the upper electrode layer 22. Thus, the lower electrode layer 21 is divided into the capacitor region 21A and the non-capacitor region 21B. The upper electrode layer 22 is entirely the capacitor region 22A.

Figure 17:
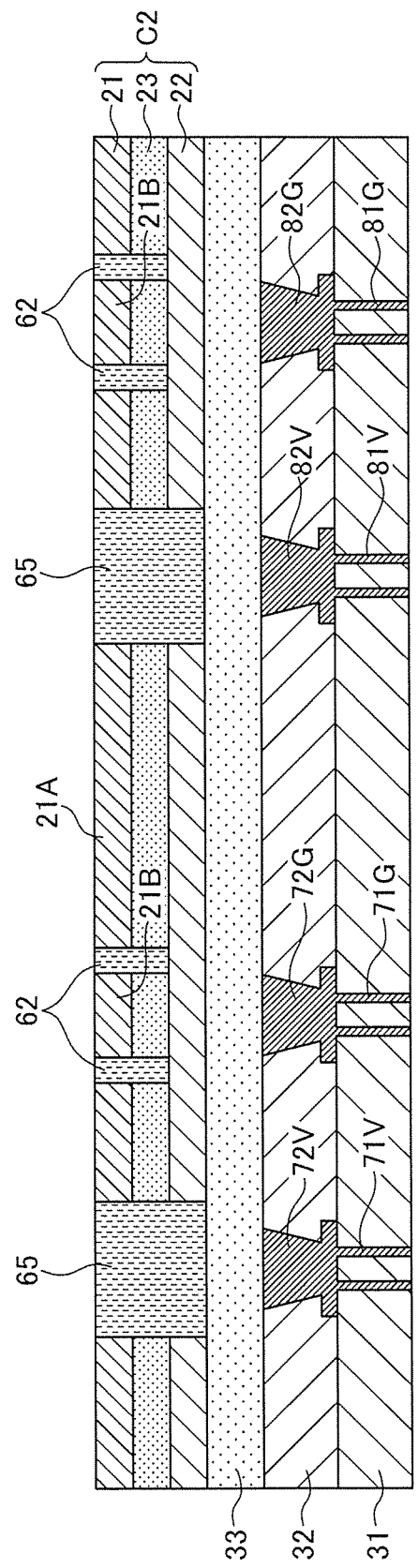
Figure 18:
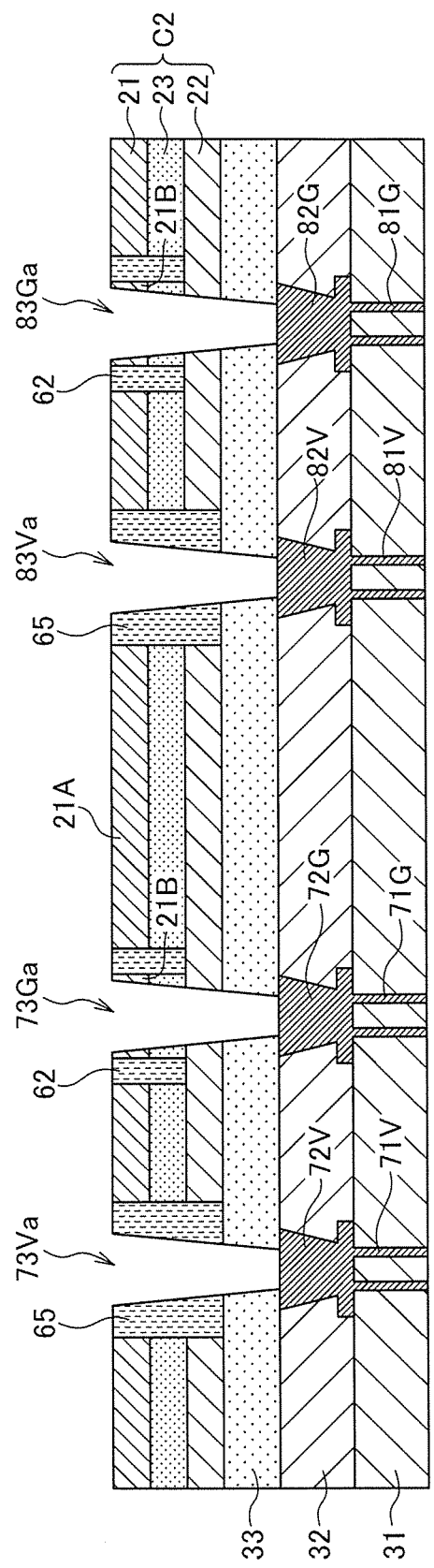

Then, as illustrated in FIG. 17, the insulators 62 and 65 are embedded in the openings 62a and 65a, respectively. Subsequently, as illustrated in FIG. 18, there are formed through holes 73Va, 73Ga, 83Va and 83Ga penetrating the second thin film capacitor C2 and insulating layer 33 and reaching the power supply patterns 72V, 72G, 82V and 82G, respectively. The through holes 73Va and 83Va are formed at positions each penetrating the insulator 65, and the through holes 73Ga and 83Ga are formed at locations each passing through the inner diameter portion of the ring-shaped insulator 62.

Figure 19:
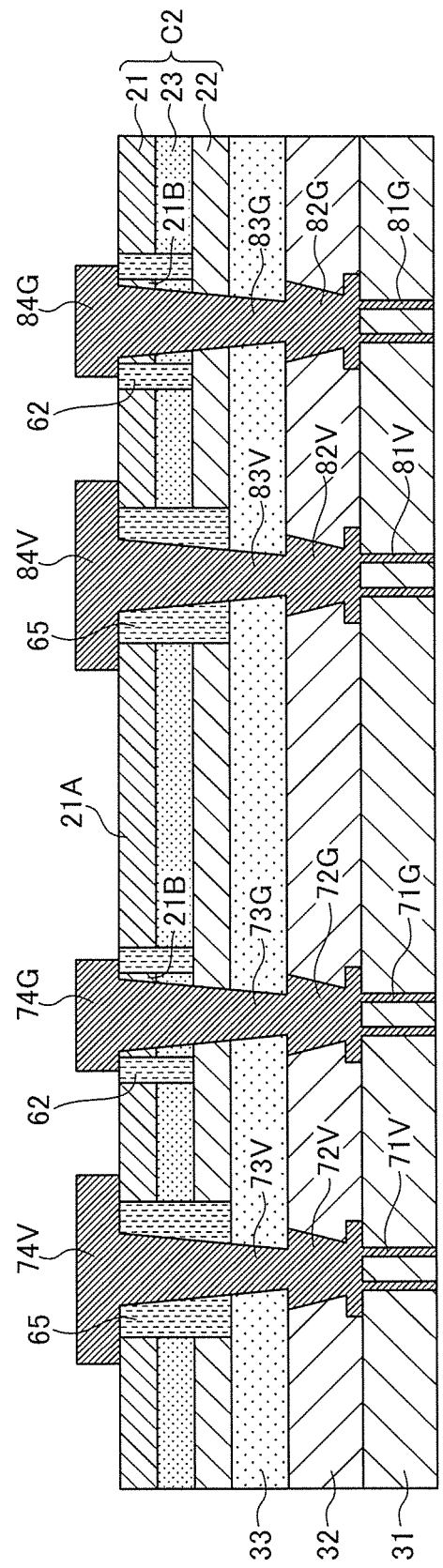

Subsequently, as illustrated in FIG. 19, the via conductors 73V, 73G, 83V and 83G are formed inside the through holes 73Va, 73Ga, 83Va and 83Ga, respectively, and the power supply patterns 74V, 74G, 84V and 84G are formed on the surface of the second thin film capacitor C2. At this time, the power supply patterns 74V and 84V are each formed to have a planar size larger than the outer diameter of the insulator 65 so as to contact the capacitor region 21A of the lower electrode layer of the second thin film capacitor C2. On the other hand, the power supply patterns 74G and 84G are each formed to have a planar size smaller than the outer diameter of the insulator 62 so as not to contact the capacitor region 21A.

Figure 20:
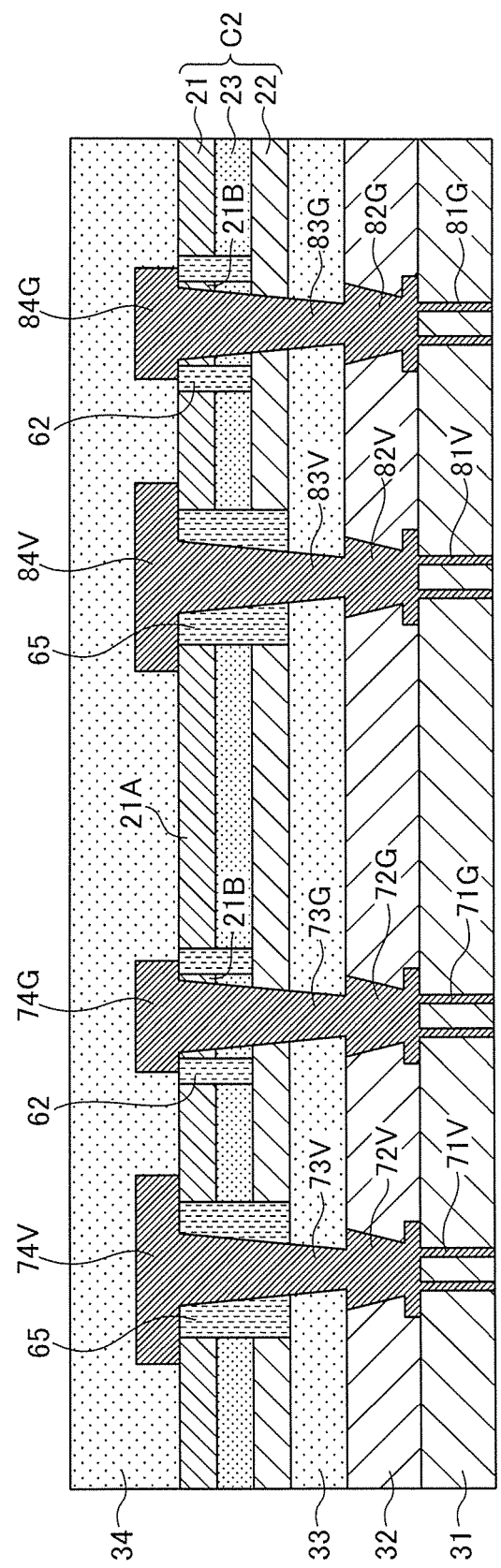
Figure 21:
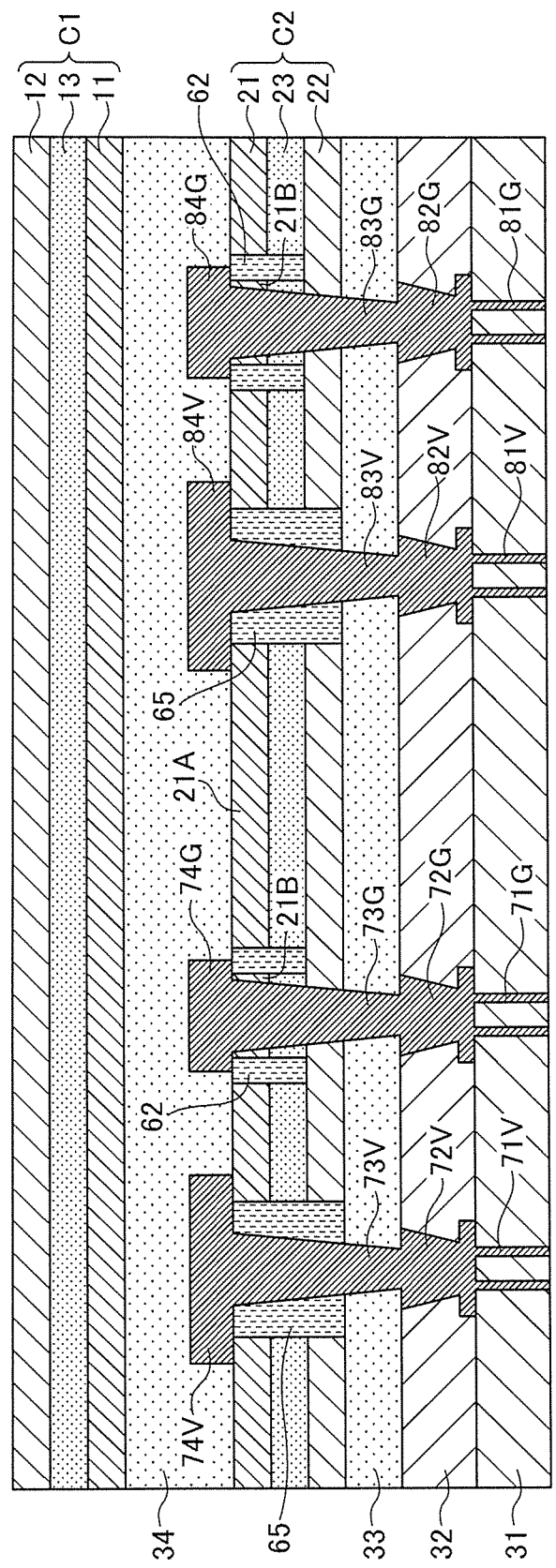
Figure 22:
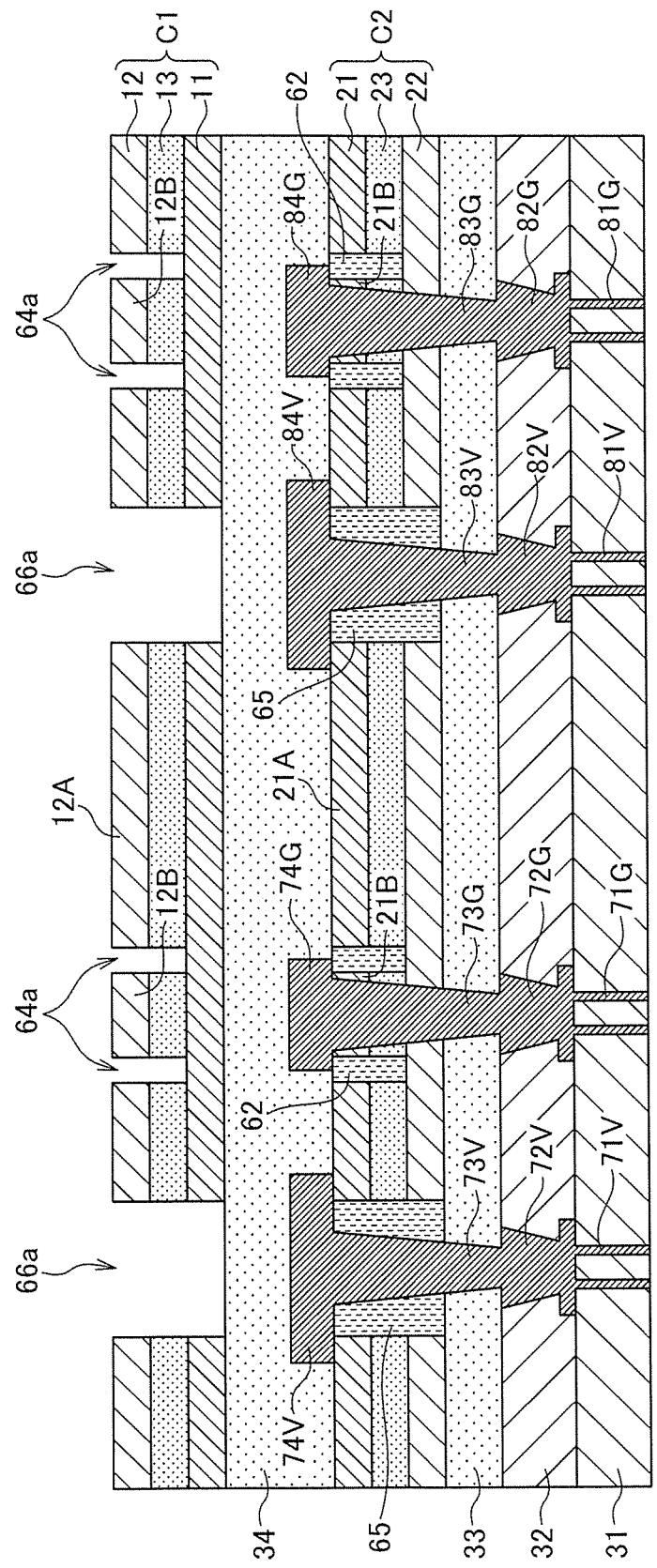

Then, as illustrated in FIG. 20, the insulating layer 34 is laminated on the surface of the second thin film capacitor C2, and then the first thin film capacitor C1 is laminated on the surface of the insulating layer 34 as illustrated in FIG. 21. In the present embodiment, the first thin film capacitor C1 in which the lower electrode layer 11 and upper electrode layer 12 have not been patterned is laminated. Subsequently, as illustrated in FIG. 22, the first thin film capacitor C1 is patterned to form openings 66a at locations overlapping the power supply patterns 74V and 84V, respectively, and ring-shaped openings 64a at locations overlapping the power supply patterns 74G and 84G, respectively. The opening 66a is formed so as to penetrate the first thin film capacitor C1, and the insulating layer 34 is exposed on the bottom portion of the opening 66a. On the other hand, the ring-shaped opening 64a has such a depth as to penetrate the upper electrode layer 12 and not to penetrate the lower electrode layer 11. Thus, the upper electrode layer 12 is divided into the capacitor region 12A and non-capacitor region 12B. The lower electrode layer 11 is entirely the capacitor region 11A.

Figure 23:
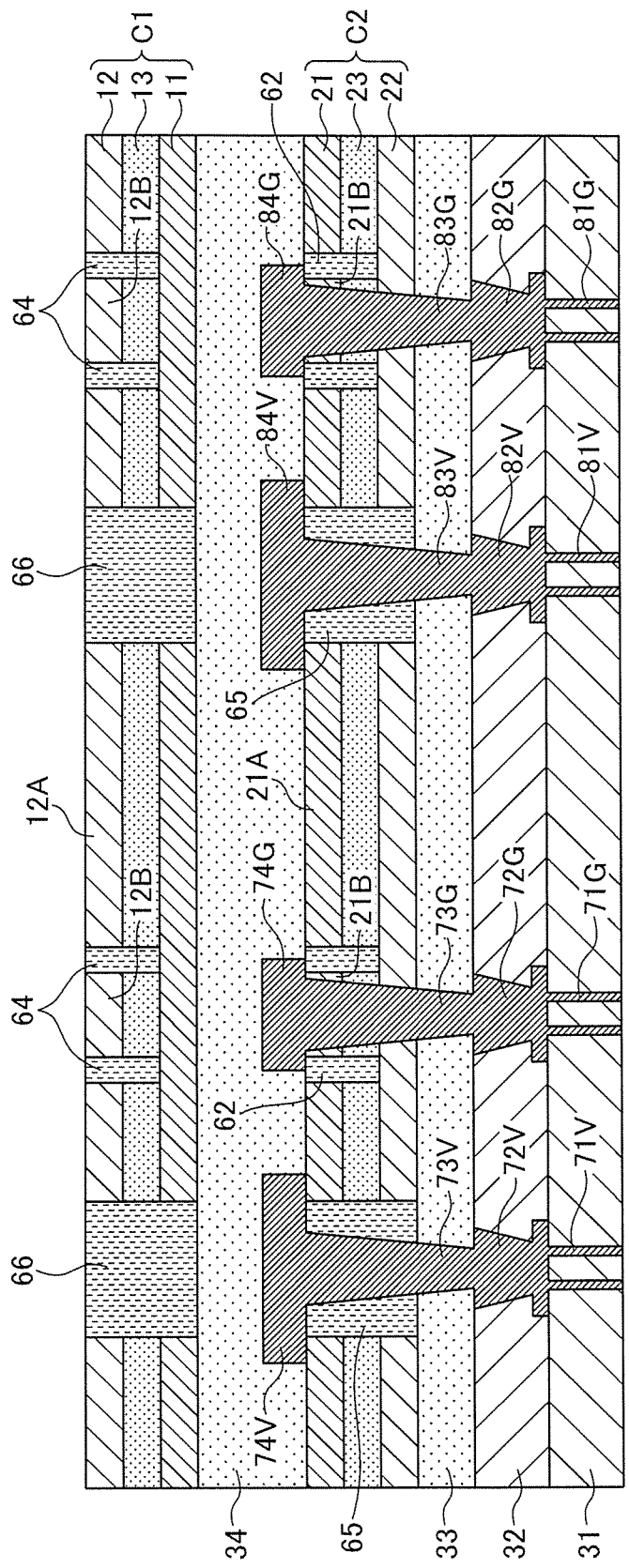
Figure 24:
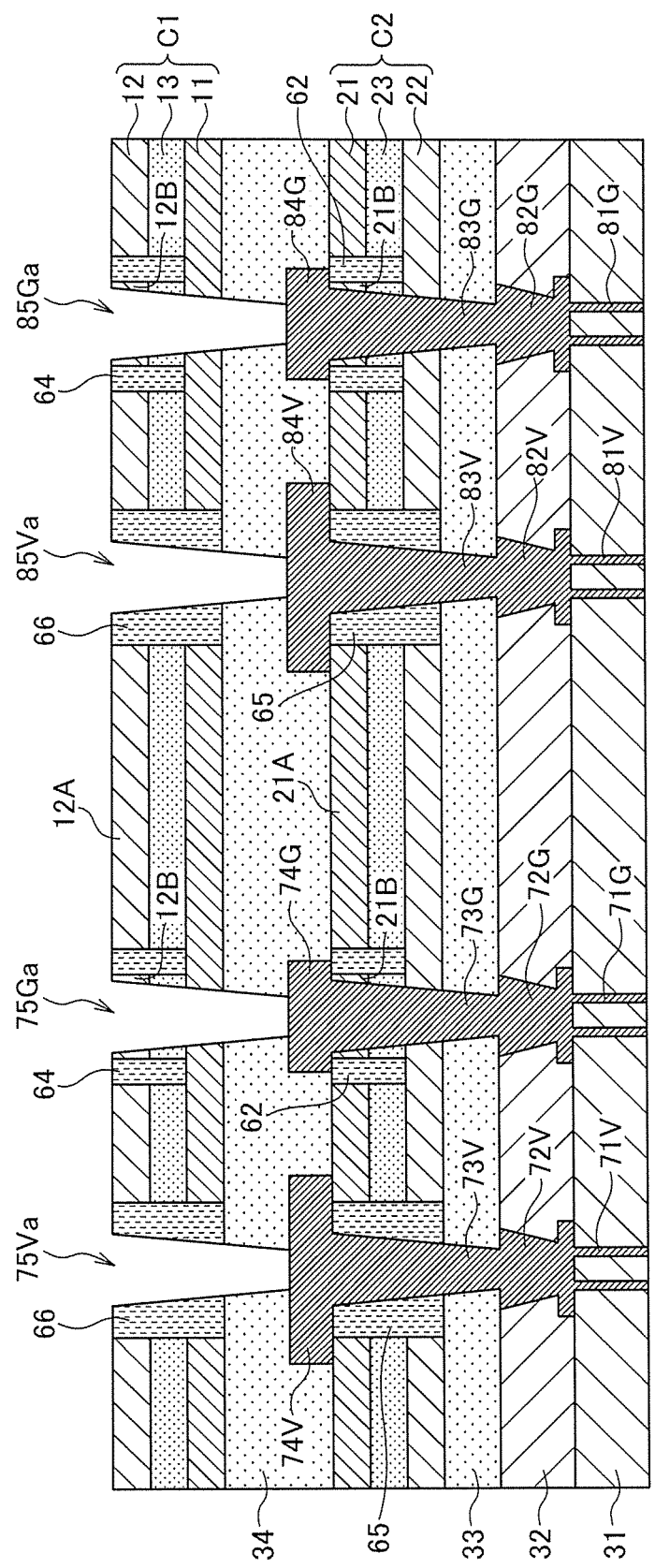

Then, as illustrated in FIG. 23, the insulators 64 and 66 are embedded in the openings 64a and 66a, respectively. Subsequently, as illustrated in FIG. 24, there are formed through holes 75Va, 75Ga, 85Va and 85Ga penetrating the first thin film capacitor C1 and insulating layer 34 and reaching the power supply patterns 74V, 74G, 84V and 84G, respectively. The through holes 75Va and 85Va are formed at locations each penetrating the insulator 66, and the through holes 75Ga and 85Ga are formed at locations each passing through the inner diameter portion of the ring-shaped insulator 64.

Figure 25:
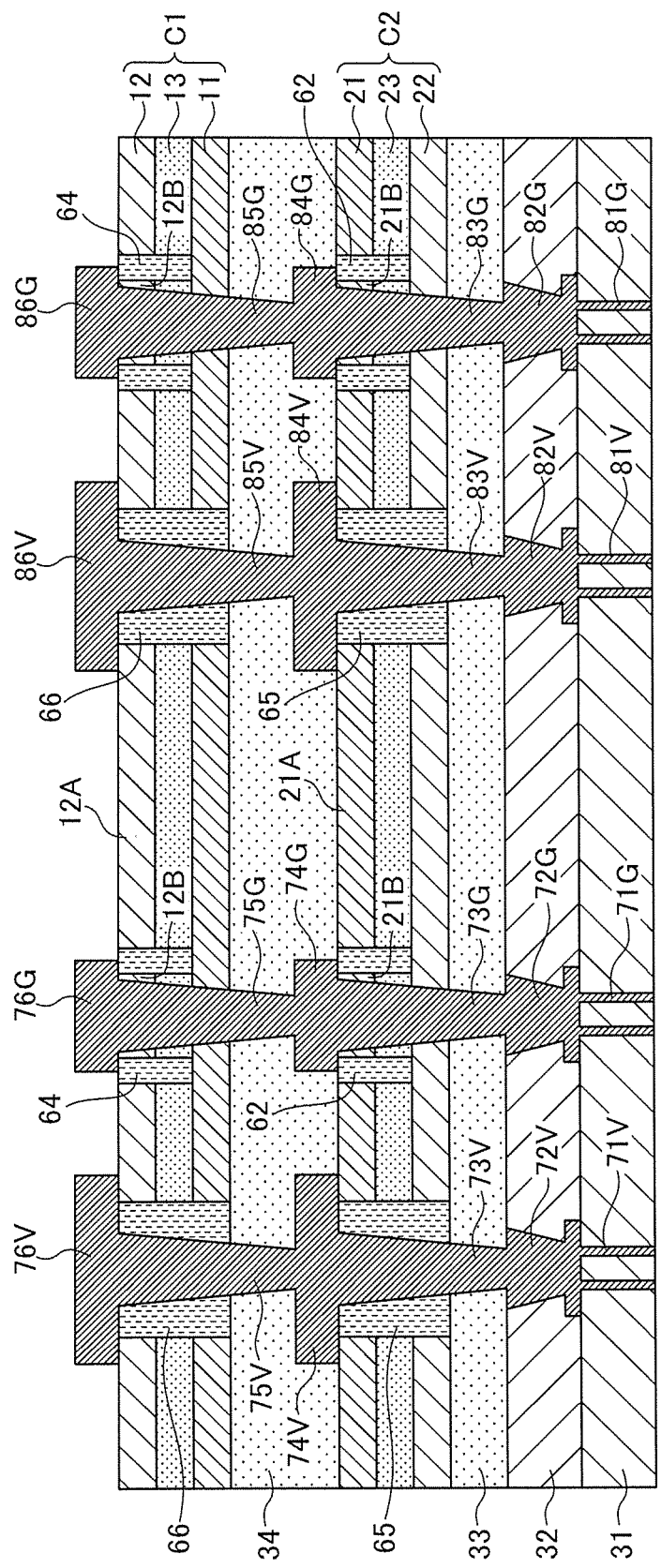

Subsequently, as illustrated in FIG. 25, the via conductors 75V, 75G, 85V and 85G are formed inside the through holes 75Va, 75Ga, 85Va and 85Ga, respectively, and the power supply patterns 76V, 76G, 86V and 86G are formed on the surface of the first thin film capacitor C1. At this time, the power supply patterns 76V and 86V are each formed to have a planar size larger than the outer diameter of the insulator 66 so as to contact the capacitor region 12A of the upper electrode layer of the first thin film capacitor C1. On the other hand, the power supply patterns 76G and 86G are each formed to have a planar size smaller than the outer diameter of the insulator 64 so as not to contact the capacitor region 12A.

Figure 26:
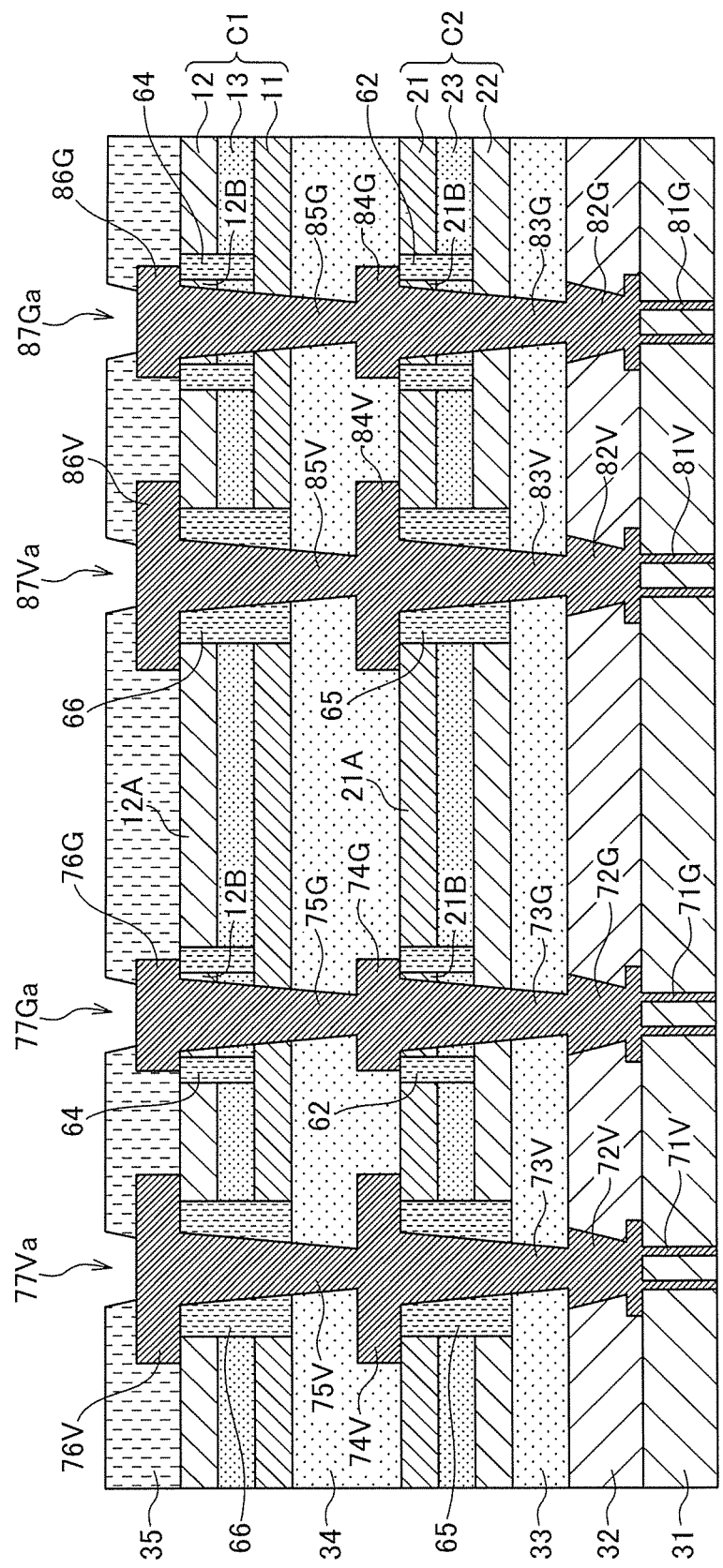
Figure 27:
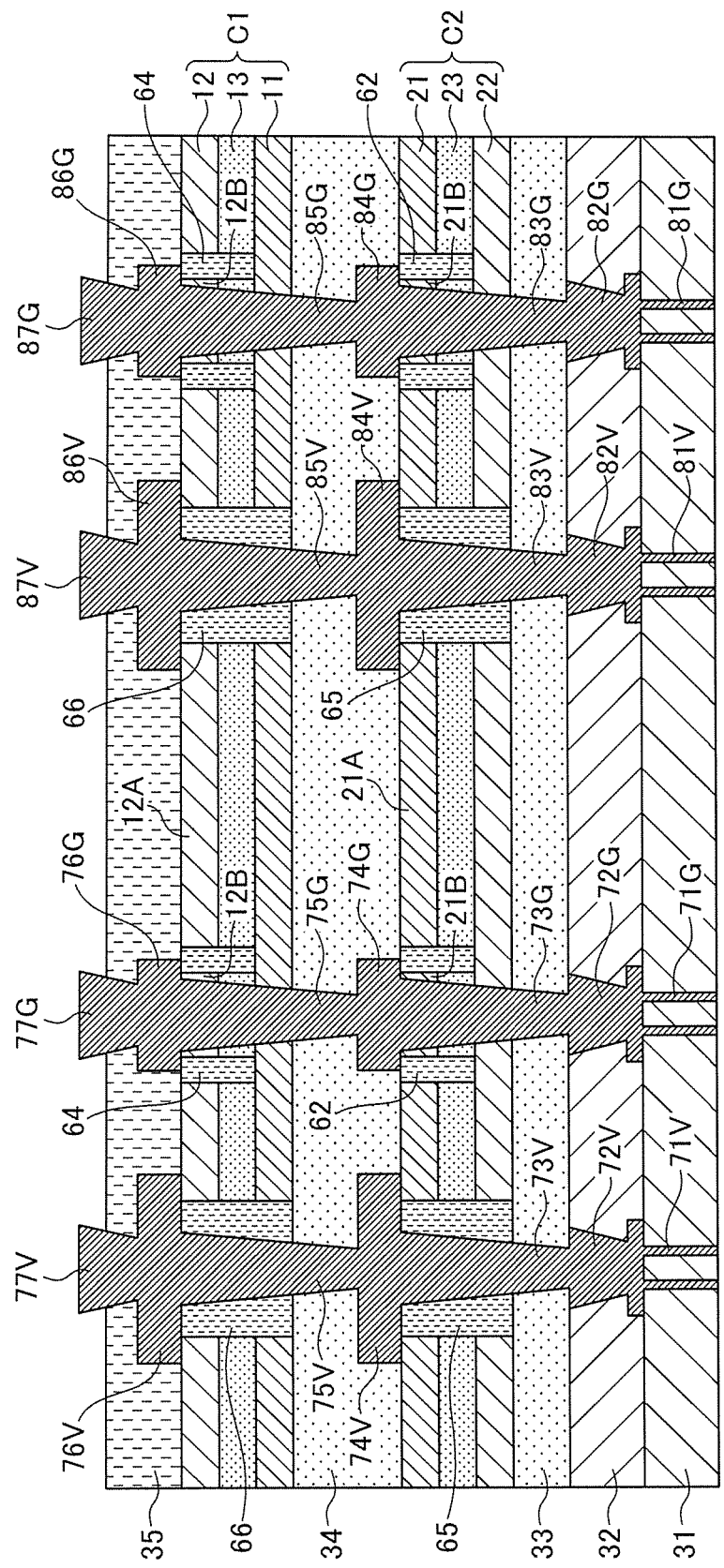

Subsequently, as illustrated in FIG. 26, the insulating layer 35 is laminated on the surface of the first thin film capacitor C1, and then there are formed through holes 77Va, 77Ga, 87Va and 87Ga penetrating the insulating layer 35 and reaching the power supply patterns 76V, 76G, 86V and 86G, respectively. Subsequently, as illustrated in FIG. 27, the power supply patterns 77V, 77G, 87V and 87G are formed inside the through holes 77Va, 77Ga, 87Va and 87Ga, respectively.

Finally, the semiconductor chip 40 is mounted on the component mounting surface 35a so as to be connected to the power supply patterns 77V and 77G, and the semiconductor chip 50 is mounted on the component mounting surface 35a so as to be connected to the power supply patterns 87V and 87G, whereby the thin film capacitor embedded substrate 2 of FIG. 14 according to the second embodiment is completed.

As described above, the thin film capacitor embedded substrate 2 according to the present embodiment has a configuration in which the thin film capacitors C1 and C2 in each of which the upper and lower electrode layers have not been patterned are laminated on the substrate and can thus be easily changed in design.

Figure 28:
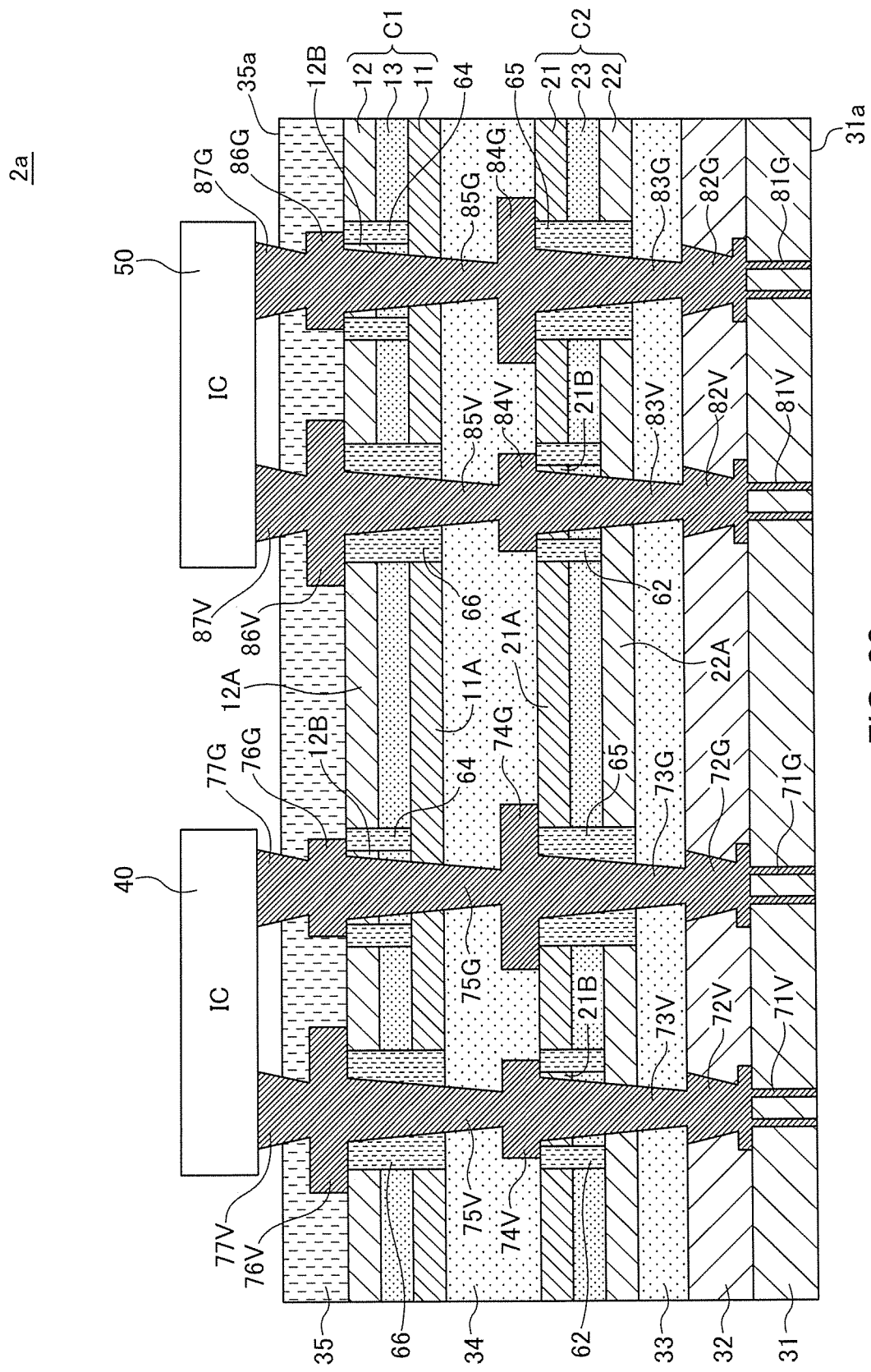
FIG. 28 is a schematic cross-sectional view for explaining the structure of a thin film capacitor embedded substrate according to a modification of the second embodiment of the present invention.

FIG. 28 is a schematic cross-sectional view for explaining the structure of a thin film capacitor embedded substrate 2a according to a modification of the second embodiment.

As illustrated in FIG. 28, in the thin film capacitor embedded substrate 2a according to the modification, the ring-shaped insulators 62 are provided at locations corresponding respectively to the via conductors 73V and 83V, and the insulators 65 are provided at locations corresponding respectively to the via conductors 73G and 83G. Further, of the power supply patterns 74V, 74G, 84V and 84G, the power supply patterns 74G and 84G are formed to have a planar size larger than the outer diameter of the insulator 65 so as to contact the capacitor region 21A of the lower electrode layer of the second thin film capacitor C2. On the other hand, the power supply patterns 74V and 84V are formed to have a planar size smaller than the outer diameter of the insulator 62 so as not to contact the capacitor region 21A. Other basic configurations are the same as those of the thin film capacitor embedded substrate 2 illustrated in FIG. 14, so the same reference numerals are given to the same elements, and overlapping description will be omitted.

In the thin film capacitor embedded substrate 2a according to the modification, the capacitor regions 11A and 21A made of the same conductive material (e.g., nickel) are short-circuited, and the capacitor regions 12A and 22A made of the same conductive material (e.g., copper) are short-circuited. This allows the same potential to be applied to the same conductive material.

It is apparent that the present invention is not limited to the above embodiments, but may be modified and changed without departing from the scope and spirit of the invention.

For example, the two thin film capacitors C1 and C2 having mutually different self-resonant frequencies are used in the above-described thin film capacitor embedded substrate 1 or 2; however, in the present invention, the number of the thin film capacitors to be embedded the substrate is not limited to this. Thus, three or more thin film capacitors having mutually different self-resonant frequencies may be embedded the substrate.

What is claimed is:

1. A thin film capacitor embedded substrate comprising:
   a substrate having a component mounting surface;
   a plurality of thin film capacitors including at least first and second thin film capacitors embedded in the substrate; and
   a plurality of semiconductor chips mounted on the component mounting surface, wherein the first and second thin film capacitors are connected in parallel and have mutually different self-resonant frequencies, wherein the first thin film capacitor has a self-resonant frequency higher than that of the second thin film capacitor, wherein the first thin film capacitor is disposed closer to the component mounting surface side than the second thin film capacitor, and wherein the plurality of semiconductor chips have mutually the same operating frequency or at least some of the plurality of semiconductor chips have mutually different operating frequencies from one another.

2. The thin film capacitor embedded substrate as claimed in claim 1, wherein each of the first and second thin film capacitors has a lower electrode layer made of a first conductive material and an upper electrode layer made of a second conductive material different from the first conductive material, and wherein the lower electrode layers or upper electrode layers of the respective first and second thin film capacitors are disposed so as to face each other.

3. The thin film capacitor embedded substrate as claimed in claim 1, wherein the plurality of thin film capacitors include a third thin film capacitor connected in parallel to the first and second thin film capacitors, and wherein the first to third thin film capacitors have mutually different self-resonant frequencies.

4. A method for manufacturing a thin film capacitor embedded substrate, the method comprising:

laminating, on a substrate, at least first and second thin film capacitors having mutually different self-resonant frequencies and then patterning an upper electrode layer and a lower electrode layer of each of the first and second thin film capacitors; and connecting in parallel the first and second thin film capacitors by forming a via conductor penetrating the first and second thin film capacitors.

* * * * *